United States Patent [19]

Tsutsui et al.

[11] Patent Number: 4,989,277
[45] Date of Patent: Feb. 5, 1991

[54] TOILET BOWL FLUSHING DEVICE

[75] Inventors: Osamu Tsutsui; Hisato Haraga; Atsuo Makita; Hirofumi Takeuchi, all of Kanagawa, Japan

[73] Assignee: Toto Ltd., Fukuika, Japan

[21] Appl. No.: 317,929

[22] Filed: Mar. 2, 1989

[30] Foreign Application Priority Data

| Mar. 2, 1988 | [JP] | Japan | 63-49993 |
| May 13, 1988 | [JP] | Japan | 63-117460 |
| May 27, 1988 | [JP] | Japan | 63-130949 |

[51] Int. Cl.⁵ .......................... E03D 5/10; E03D 1/36
[52] U.S. Cl. .......................................... 4/367; 4/406; 4/415; 4/DIG. 3; 251/129.06
[58] Field of Search ..................... 4/300, 313, 324, 325, 4/343, 344, 345, 409, 421, 415, DIG. 3, 354, 360, 366, 367, 405, 406, 379, 388; 251/129.06

[56] References Cited

U.S. PATENT DOCUMENTS

| 3,008,682 | 11/1961 | Filliung et al. | 251/19 |
| 3,989,066 | 11/1976 | Sturman et al. | 137/624.2 |
| 4,224,703 | 9/1980 | Makhobey | 4/324 |
| 4,494,727 | 1/1985 | Babitzka et al. | 251/129.06 X |
| 4,570,272 | 2/1986 | Kawaguchi et al. | 4/302 |
| 4,695,034 | 9/1987 | Shimizu et al. | 251/129.06 |
| 4,720,077 | 1/1988 | Minoura et al. | 251/129.06 |
| 4,722,360 | 2/1988 | Odajima et al. | 251/30.01 X |

FOREIGN PATENT DOCUMENTS

| 0165407 | 12/1985 | European Pat. Off. |
| 0228908 | 7/1987 | European Pat. Off. |
| 3536967 | 4/1987 | Fed. Rep. of Germany. |
| 60-136684 | 7/1985 | Japan. |
| 61-109832 | 5/1986 | Japan. |
| 159877 | 7/1987 | Japan | 251/129.06 |

Primary Examiner—Ernest G. Cusick
Assistant Examiner—Robert M. Fetsuga
Attorney, Agent, or Firm—Merchant, Gould, Smith, Edell, Welter & Schmidt

[57] ABSTRACT

A toilet bowl flushing device washes out a toilet bowl while controlling the flow rate of flushing water supplied to the toilet bowl for a maximum flushing effect. The toilet bowl flushing device includes water supply apparatus for supplying flushing water to the toilet bowl, the water supply apparatus including a flow rate control valve for controlling a rate of flow of flushing water to be supplied to the toilet bowl, an actuator for actuating the flow rate control valve, and a control subsystem operable according to a predetermined flow rate pattern program for controlling operation of the actuator to vary the rate of flow of flushing water in one flushing cycle with respect to time from a time to start flushing the toilet bowl to a time to finish flushing the toilet bowl.

11 Claims, 21 Drawing Sheets

FIG.22
FIG.23
FIG.24
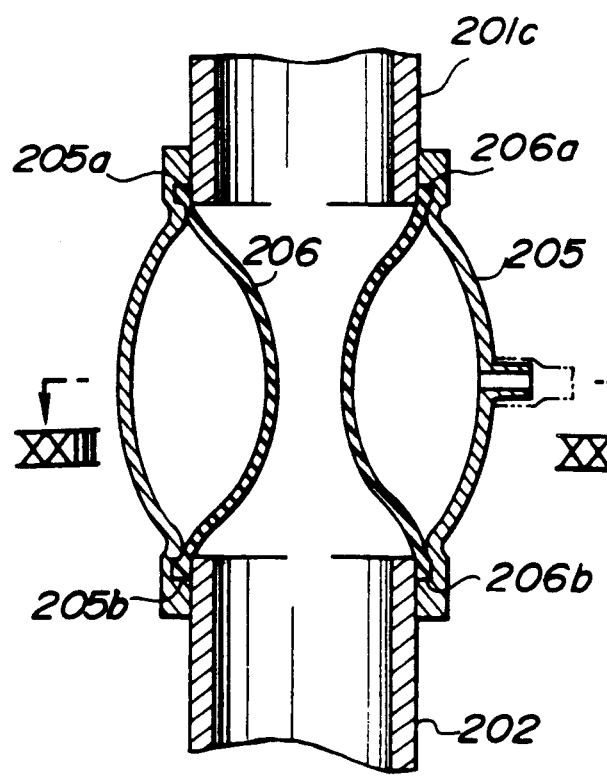
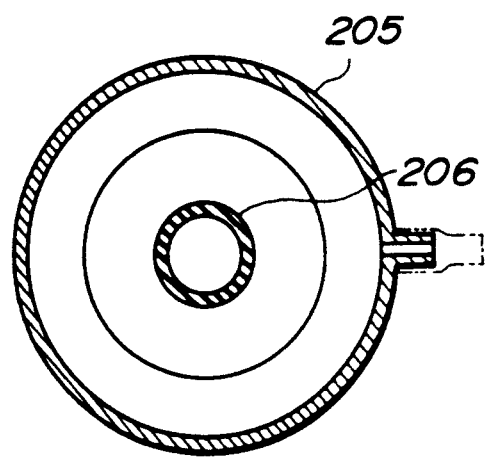
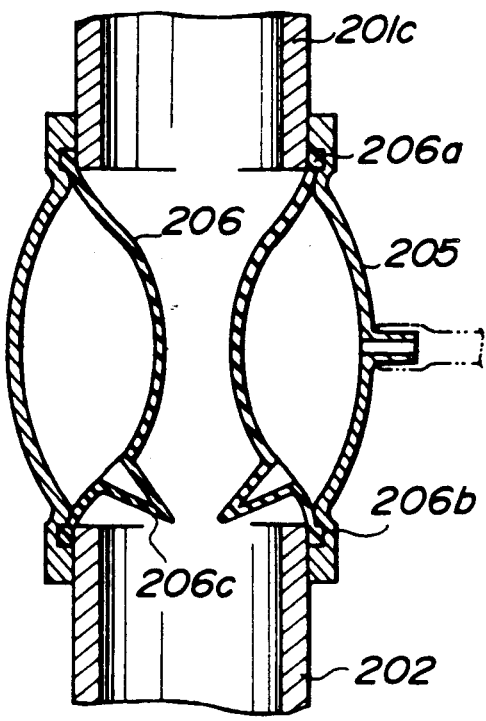

FIG. 26
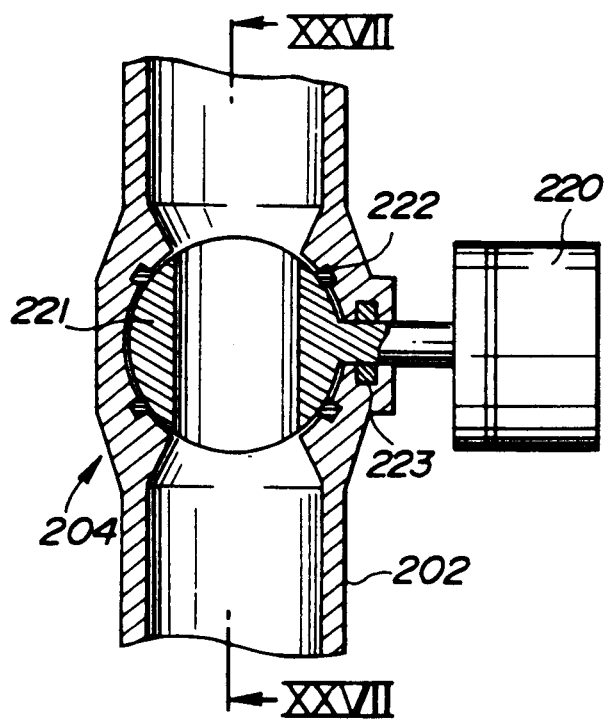
FIG. 27
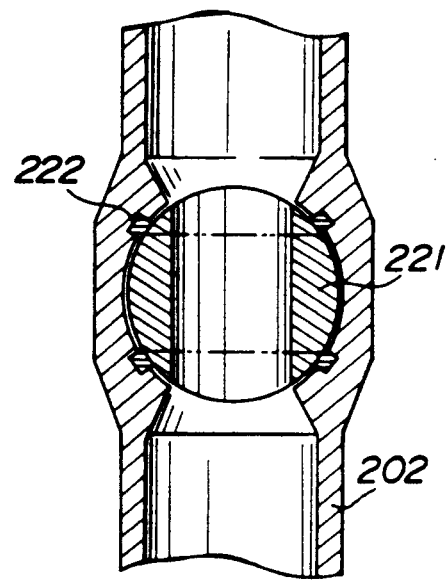
FIG. 28 FIG. 29 FIG. 30
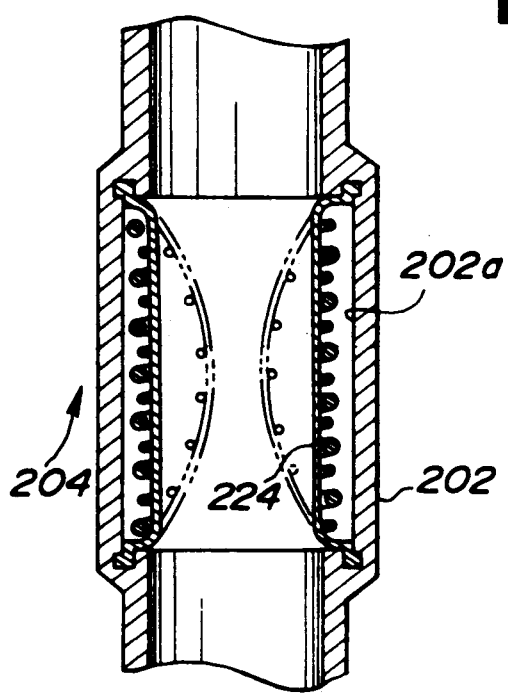
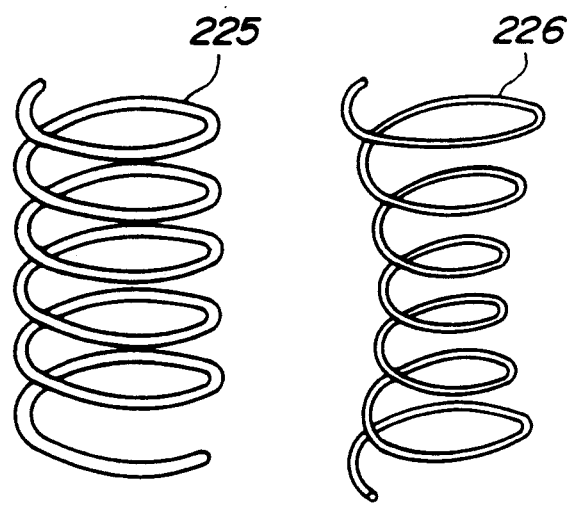

TOILET BOWL FLUSHING DEVICE

BACKGROUND OF THE INVENTION

1. Field of the Invention:

The present invention relates to a toilet bowl flushing device for supplying flushing water to a toilet bowl to wash out the same.

2. Description of the Relevant Art:

There are well known toilet bowl flushing devices having a flush valve or a solenoid-operated valve for supplying a rush of flushing water to the toilet bowl to cleanse the same after it has been used by a user.

One solenoid-operated valve assembly for use in such a toilet bowl flushing device is disclosed in Japanese Laid-Open Patent Publication No. 60-136684, for example.

The disclosed solenoid-operated valve assembly is schematically shown in FIG. 41 of the accompanying drawings. The solenoid-operated valve assembly has a body 341 defining therein a flow passage 344 having an inlet 342. The body 341 houses a shutoff cock 345, a filter 346, and a solenoid-operated valve 347 which are arranged successively down-stream from the inlet 342 with respect to the direction in which water flows through the flow passage 344. A tubular body 354 is installed on the body 341 in communication with the flow passage 344 and has an outlet 343.

The shutoff cock 345 comprises a valve member 348 and a valve holder rod 349. Normally, the valve holder rod 349 is in an upper position, as illustrated, and the valve member 348 is lifted under water pressure to open an opening 350, thus allowing flushing water to flow through the flow passage 344. For stopping the supply of flushing water, the threaded portion of the valve holder rod 349 is turned to lower the valve holder rod 349 to press the valve member 348 against its valve seat, thereby closing the opening 350.

The solenoid-operated valve 347 comprises two axially juxtaposed cylindrical electromagnetic coils 351, 352, a plunger 353 inserted centrally in the coils 351, 352 and axially movable when the coils 351, 352 are energized, and a valve member 356 engaging the lower end of the plunger 353 for selectively opening and closing an opening 355a defined in a valve seat 355.

When the coils 351, 352 remain de-energized, the plunger 353 is pressed downwardly under the bias of a spring 357 to cause the valve member 356 to close the opening 355a. When only the coil 351 is energized, the plunger 353 is elevated a predetermined distance, and the valve member 356 is displaced upwardly under water pressure to allow a smaller amount of flushing water to be discharged from the solenoid-operated valve 347. When both the coils 351, 352 are energized, the plunger 353 is lifted a larger distance to allow a larger amount of flushing water to be discharged.

Where the solenoid-operated valve assembly of this type is incorporated in a toilet bowl flushing device, therefore, different amounts of flushing water for respective defecation and urination use can selectively be discharged to flush the toilet bowl under the control of electric signals.

The toilet bowl flushing device can however select only one of two modes at a time, i.e., a mode in which a smaller amount of flushing water for urination use is supplied to the toilet bowl and a mode in which a larger amount of flushing water for defecation use is supplied to the toilet bowl. In each of these modes, the flushing water can only flow of its own accord in a fixed flow rate pattern that is determined by the water pressure, the diameter of the pipe used, and other parameters. It is not possible to control the flow rate of supplied flushing water in one flushing cycle such that the flow rate of flushing water will vary with time.

The toilet bowl flushing capability is largely governed by the configuration of the toilet bowl, the pipe arrangement, the flow rate of flushing water, the water pressure, and other factors. The fixed flow rate pattern in which flushing water flows of its own accord cannot give the maximum bowl flushing ability to individual toilet bowls, and may supply different toilet bowls with an unduly large or small amount of flushing water.

Japanese Laid-Open Patent Publication No. 61-109832, for example, discloses a toilet bowl flushing device which has a preliminary flushing mode for discharging a smaller amount of flushing water before the toilet is used to provide an increased flushing ability, in addition to a main flushing mode for discharging a larger amount of flushing water to wash out the bowl after it has been used. The disclosed toilet bowl flushing device includes a seating sensor for detecting when the user is seated on the bowl. In response to a signal from the seating sensor, a solenoid-operated valve disposed in a water supply piping system coupled to the toilet bowl is operated to discharge a smaller amount of flushing water into the toilet bowl before the toilet is used by the user.

In the above toilet bowl flushing device, however, since the flow rate of flushing water is controlled by the solenoid-operated valve of the general design, the flow rate of flushing water cannot precisely be regulated. While only a very small amount of flushing water is required in the preliminary flushing mode, a greater amount of flushing water than necessary may be discharged by the flushing device in the preliminary flushing mode, which is wasteful of flushing water. Furthermore, a trap tube connected to the toilet bowl may run short of sealed water, or a water hammer may occur in the piping system.

Generally, the water discharge piping system extending from the toilet bowl has a trap tube integrally coupled to the toilet bowl for siphoning water from the bowl to wash out the bowl effectively. In order for the trap tube to siphon water from the bowl, at least the trap tube must be filled with water. With the conventional arrangement, since flushing water is discharged even until the trap tube is filled with water, a far more amount of flushing water has to be supplied than the amount of flushing water discharged, and hence the amount of flushing water used is increased.

SUMMARY OF THE INVENTION

It is an object of the present invention to provide a toilet bowl flushing device capable of controlling the flow rate of cleaning water to be supplied, in view of the configuration of a toilet bowl, piping characteristics, water pressure, and other factors, and also dependent on preliminary and main flushing modes, and defecation and urination modes of use of the toilet bowl.

A toilet bowl flushing device according to the present invention comprises water supply means for supplying flushing water to a toilet bowl, the water supply means including a flow rate control valve for controlling a rate of flow of flushing water to be supplied to the toilet bowl, an actuator for actuating the flow rate control valve, and control means operable according to a predetermined flow rate pattern program for controlling operation of the actuator to vary the rate of flow of flushing water in one flushing cycle with respect to time from a time to start flushing the toilet bowl to a time to finish flushing the toilet bowl.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 22 is an enlarged cross-sectional view of a water discharge valve;

FIG. 23 is a cross-sectional view taken along line XXIII—XXIII of FIG. 22;

FIG. 24 is a cross-sectional view of a water discharge valve according to another embodiment;

FIG. 26 is a cross-sectional view of a water discharge valve according to still another embodiment;

FIG. 27 is a cross-sectional view taken along line XXVII—XXVII of FIG. 26;

FIGS. 28 through 30 are views of a water discharge valve according to yet another embodiment;

DETAILED DESCRIPTION OF THE PREFERRED EMBODIMENTS

A toilet bowl flushing device according to a first embodiment of the present invention will first be described below with reference to FIGS. 1 through 14.

Figure 1:
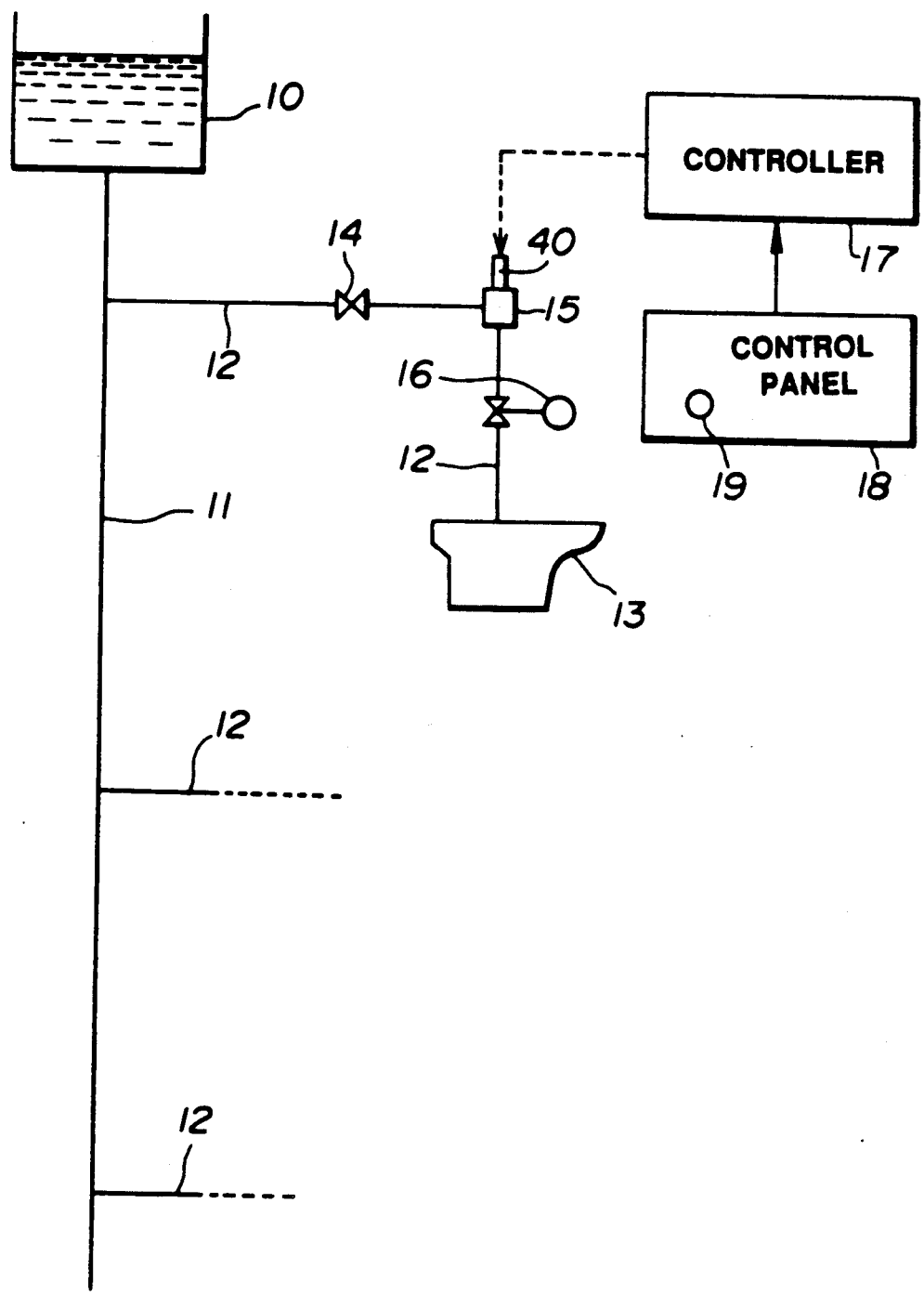
FIG. 1 is a schematic diagram, partly in block form, of a toilet bowl flushing device according to a first embodiment of the present invention.

As shown in FIG. 1, flushing water is supplied from a water tank 10 placed on the top of a building or the like through a main water supply pipe 11 and a branch water supply pipe 12 to each of toilet bowls 13 on various floors of the building.

The branch water supply pipe 12 has a shutoff cock 14, a flow rate control valve 15, and a vacuum breaker 16 arranged successively in a flow passage from the main water supply pipe 11 to the toilet bowl 13.

The flow rate control valve 15 is actuated by an actuator 40 which is controlled by a controller 17 to which there is connected a control panel 18 having a flushing button 19.

Figure 2:
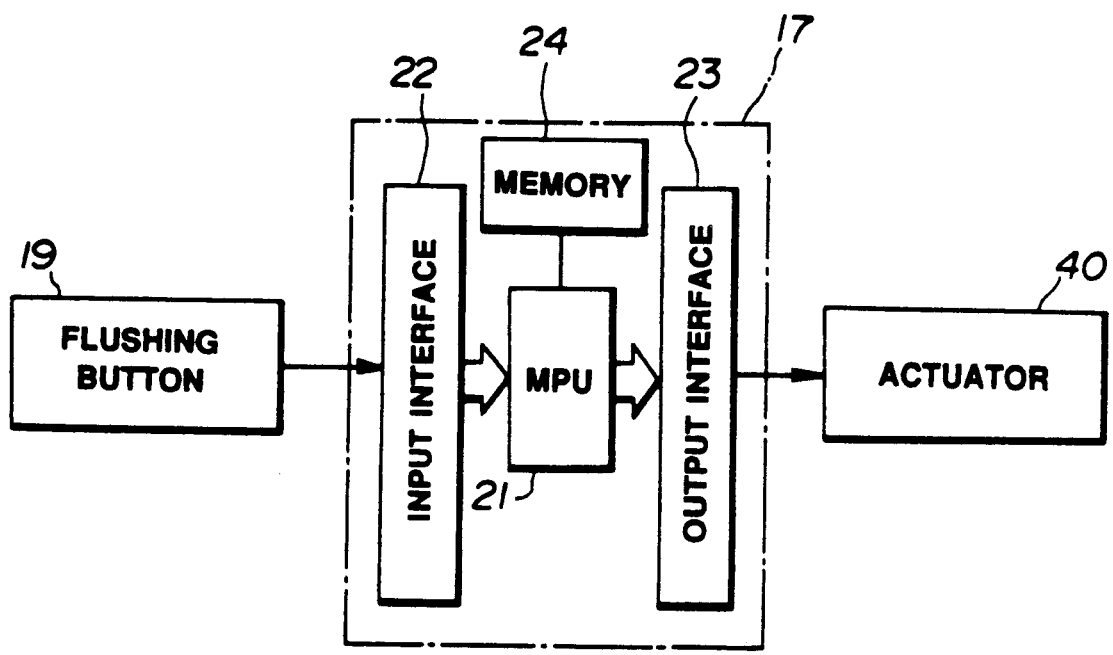
FIG. 2 is a block diagram of a controller of the toilet bowl flushing device shown in FIG. 1.
Figure 5:
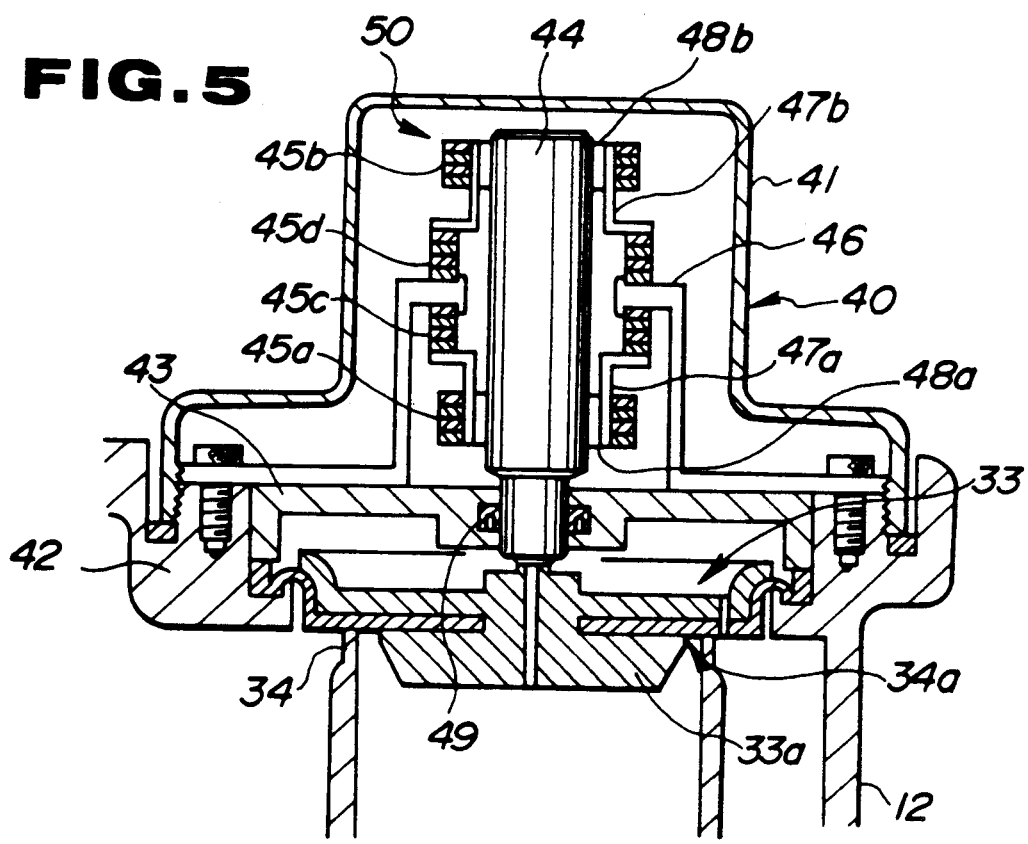
FIG. 5 is an enlarged fragmentary vertical cross-sectional view of a flow control valve and its actuator.

As illustrated in FIG. 2, the controller 17 comprises a microprocessor 21, an input interface 22, an output interface 23, and a memory 24 for storing a flow rate pattern program to provide a maximum flushing effect in view of the configuration of the toilet bowl 13, the characteristics of the water supply pipes 11, 12, and the pressure of supplied flushing water, and a program for energizing piezoelectric elements 45a, 45b, 45c, 45d (FIG. 5).

After the toilet has been used by a user, the user presses the flushing button 19 on the control panel 18 to apply a signal to the input interface 22 of the controller 17. When the signal is applied to the input interface 22, the microprocessor 21 reads the flow rate pattern program from the memory 24 and outputs a control signal via the output interface 24 according to the flow rate pattern program to control the actuator 40 for the flow rate control valve 15. The toilet bowl 13 is now supplied with flushing water in a predetermined flow rate pattern.

Figure 3:
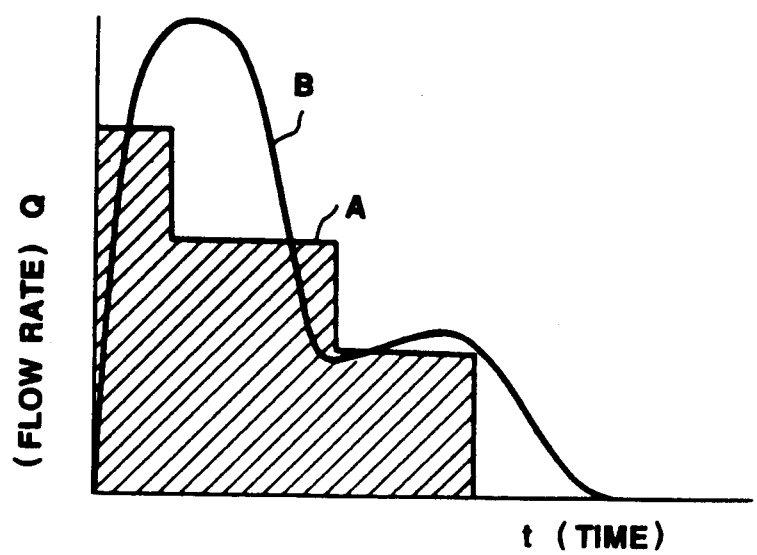
FIG. 3 is a graph showing a flow rate pattern.

FIG. 3 shows a flow rate pattern A according to the present invention and a conventional flow rate pattern B in which flushing water is discharged of its own accord. According to the flow rate pattern A, the amount of flushing is reduced three times in a stepwise manner as a function of time. More specifically, in the first stage, a larger amount of flushing water is supplied, and then in the second stage, a slightly smaller amount of flushing water is supplied for a prescribed period of time, followed by a much smaller amount of water supplied in the final stage.

By discharging flushing water according to the flow rate pattern A, a trap pipe in the toilet bowl develops an early siphoning effect which can be continued by successively supplying a smaller amount of flushing water. Therefore, excrementitious deposits in the toilet bowl 13 can completely be removed and discharged, and sealed water can be maintained in the trap pipe. The flushing effect of the flow rate pattern A is much better than the conventional flow rate pattern B. As can be understood from FIG. 3, the total amount of flushing water used is much smaller than that which is supplied according to the conventional flow rate pattern B.

The toilet bowl flushing device will be described in specific detail with reference to FIG. 4.

Figure 4:
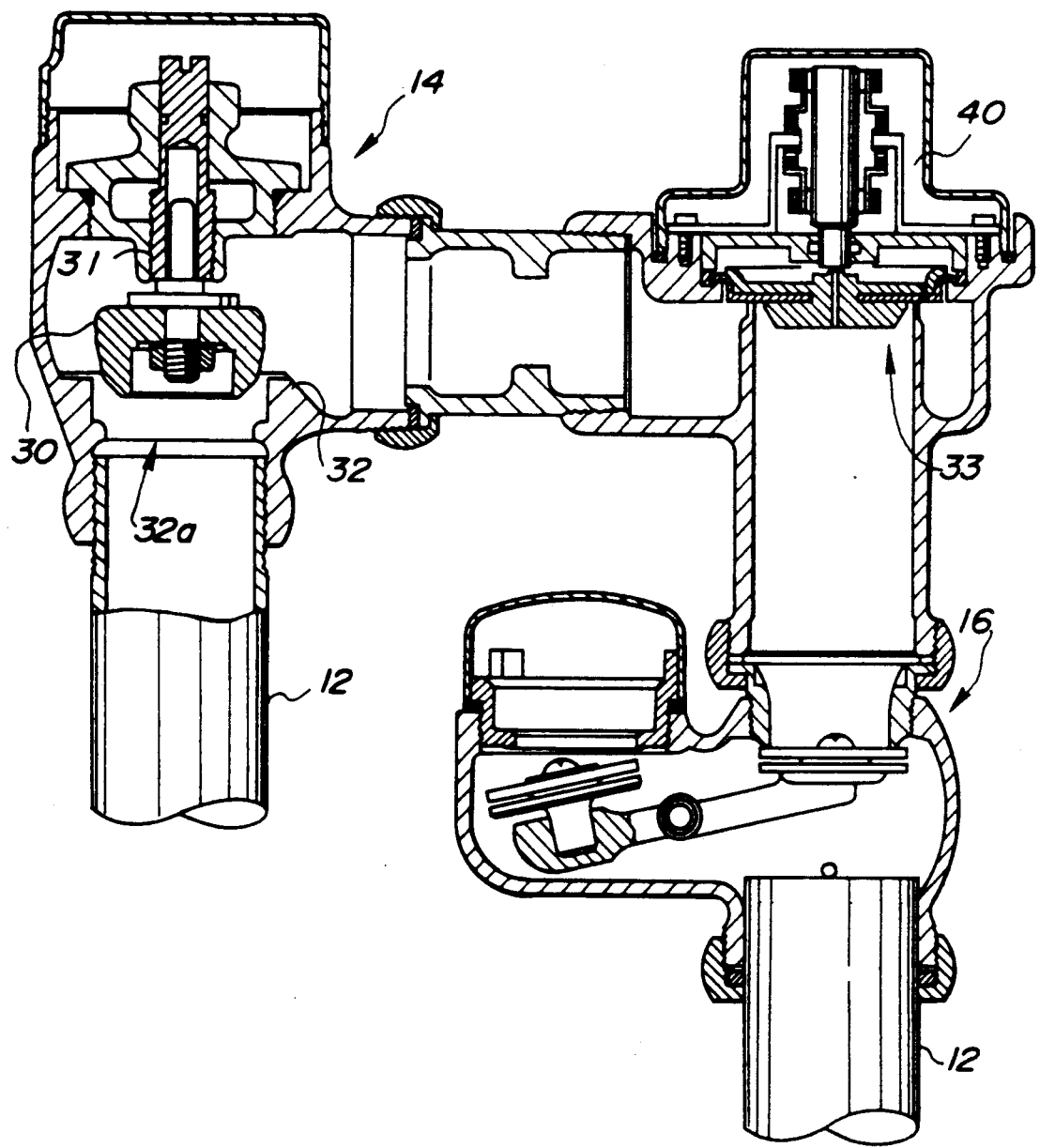
FIG. 4 is a fragmentary vertical cross-sectional view of the toilet bowl flushing device shown in FIG. 1.

As shown in FIG. 4, the shutoff cock 14 comprises a valve member 30, a valve holder rod 31, and a valve seat 32. Normally, the valve holder rod 31 is in an upper position and the valve member 30 is lifted under water pressure to open an opening 32a in the valve seat 32, as shown. To stop the supply of flushing water, the threaded portion of the valve holder rod 31 is turned to move the valve holder rod 31 downwardly to press the valve member 30 against the valve seat 32 to close the opening 32a.

In this embodiment, the flow rate control valve 15 comprises a diaphragm valve 33, and the actuator for driving the diaphragm valve 33 comprises a laminated piezoelectric actuator 40.

The piezoelectric actuator 40 will be described below with reference to FIGS. 5 through 13.

As illustrated in FIG. 5, the piezoelectric actuator 40 comprises a plunger 44 having a distal end abutting against a valve member 33a of the diaphragm valve 33, and a piezoelectric element assembly 50 for axially moving the plunger 44. The diaphragm valve 33 comprises the valve member 33a and a valve seat 34 having an opening 34a which can be opened and closed by the valve member 33a.

The plunger 44 is axially movably supported on a base plate 43 mounted on a base 42. The piezoelectric element assembly 50 comprises four piezoelectric elements 45a, 45b, 45c, 45d disposed concentrically around the plunger 44, and a holder 46 and resilient bridges 47a, 47b which support the piezoelectric elements 45a, 45b, 45c, 45d on the base plate 43 and the base 42. A casing 41 is mounted on the base 42 in surrounding relation to the plunger 44 and the piezoelectric element assembly 50.

The piezoelectric elements 45c, 45d are fixed to a distal end of the holder 46 and disposed substantially centrally in the casing 41, the holder 46 having a proximal end secured to the base 42.

The resilient bridges 47a, 47b have proximal ends fixed to the piezoelectric elements 45c, 45d, respectively, and free ends extending axially of the plunger 44 in a cantilevered fashion. The piezoelectric elements 45a, 45b are attached to the outer peripheral surfaces of the free ends of the resilient bridges 47a, 47b, with clamp rings 48a, 48b attached to their inner peripheral surfaces.

When the piezoelectric elements 45a, 45b, 45c, 45d are energized, they are axially elongated and radially contracted. When de-energized, the piezoelectric elements 45a, 45b, 45c, 45d restore their original shape.

Therefore, when energized, the piezoelectric elements 45a, 45b reduce their inside diameter to clamp the plunger 44, and when de-energized, they are expanded radially to increase their inside diameter to unclamp the plunger 44. When the piezoelectric elements 45c, 45d are energized, they are elongated axially of the plunger 44, and when they are de-energized, they are contracted axially of the plunger 44 to restore their original axial length. The plunger 44 can axially moved by controlling the energization and de-energization of the piezoelectric elements 45a, 45b, 45c, 45d with the controller 17 based on the program stored in the memory 24 (FIG. 2).

Figure 6:
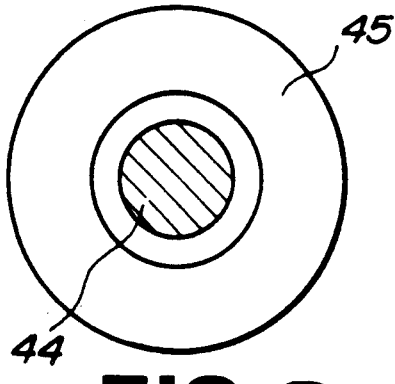

As shown in FIGS. 5 and 6, each of the piezoelectric elements 45a, 45b, 45c, 45d has a cylindrical shape including a number of piezoelectric layers laminated in the axial direction of the plunger 44. The piezoelectric element can be axially elongated and radially contracted by applying a voltage between electrodes on the opposite ends of the cylindrical piezoelectric element.

The piezoelectric layers may be made of a piezoelectric ceramic material such as a ferroelectric material having a crystal structure of ABO, perovskite which may be $PZT(Pb(Zr,Ti)O_3$, $PLZT(Pb(Zr,Ti)O_3$, $PT(PbTiO_3)$, or a PZT-base three-component material.

Figure 7:
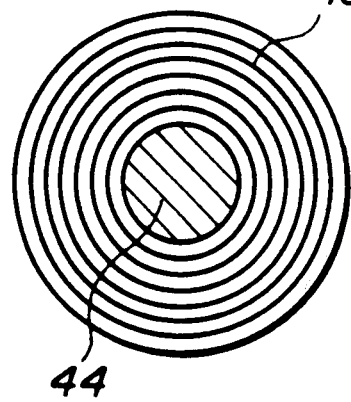
FIGS. 6 through 9 are cross-sectional views of a piezoelectric element of the actuator.

As shown in FIG. 7, each of the piezoelectric elements 45a through 45d may comprise a number of thin ring-shaped piezoelectric layers 451 laminated radially around the plunger 44. In this arrangement, a voltage is applied in a direction which is 90° shifted from the direction in which the voltage is applied in the previous embodiment.

Figure 9:
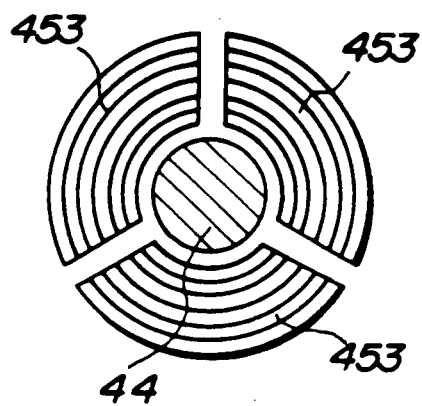
Figure 8:
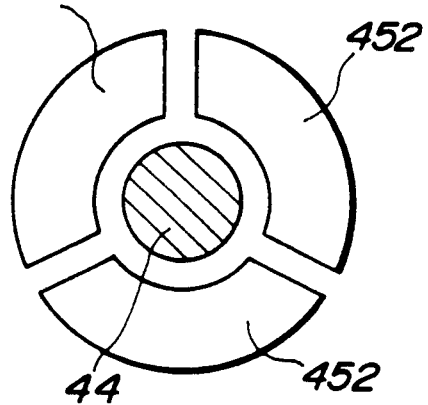

The piezoelectric elements 45a through 45d may be rectangular in cross section rather than circular as illustrated above. Moreover, the piezoelectric elements 45a through 45d may be composed of arcuate segments 452, 453 as shown in FIGS. 8 and 9.

As shown in FIG. 5, a U- or Y-shaped packing 49 having a small sliding resistance is disposed between the base plate 43 and the plunger 44 to make the actuator 40 watertight. Any of the mutually sliding surfaces of the packing 49 and the sleeve 44 may be coated with a wear-resistant material having a low coefficient of friction such as fluoroplastics, polyethylene plastics, of the like.

The plunger 44 which is frequently clamped by the clamp ring 48a, 48b positioned inside of the piezoelectric elements 45a, 45b should preferably be made of a material such as ceramics or silver which has a small coefficient of expansion and high wear resistance, and can be machined to high accuracy.

An operation process for axially moving the plunger 44 with the actuator 40 will be described with reference to FIGS. 10 through 13.

Figure 10:
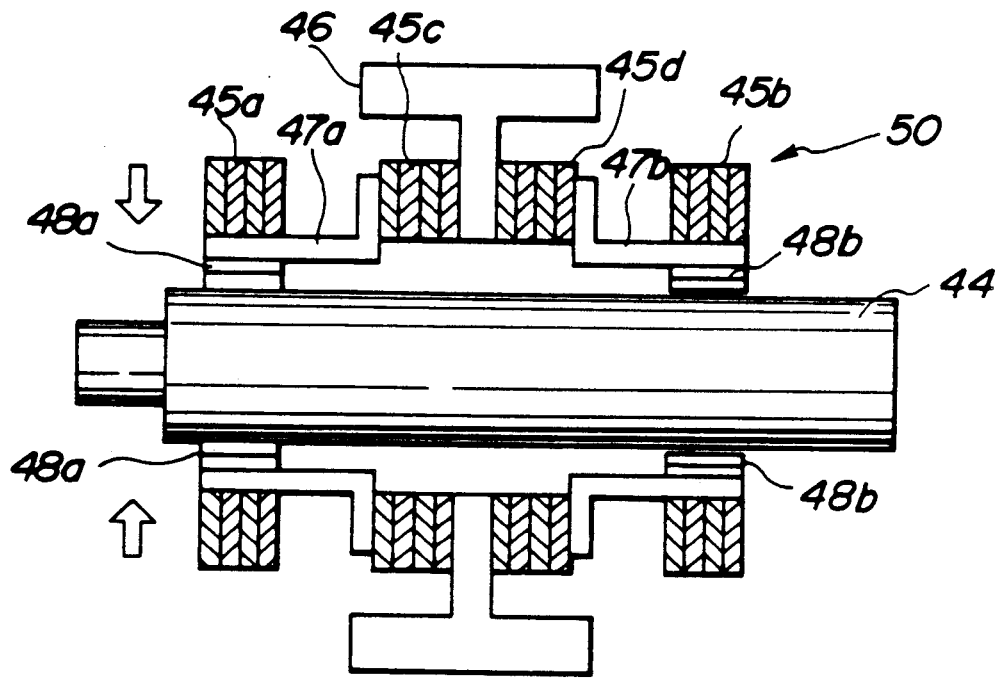
FIGS. 10 through 13 are cross-sectional views illustrating the manner in which the piezoelectric actuator operates.
Figure 11:
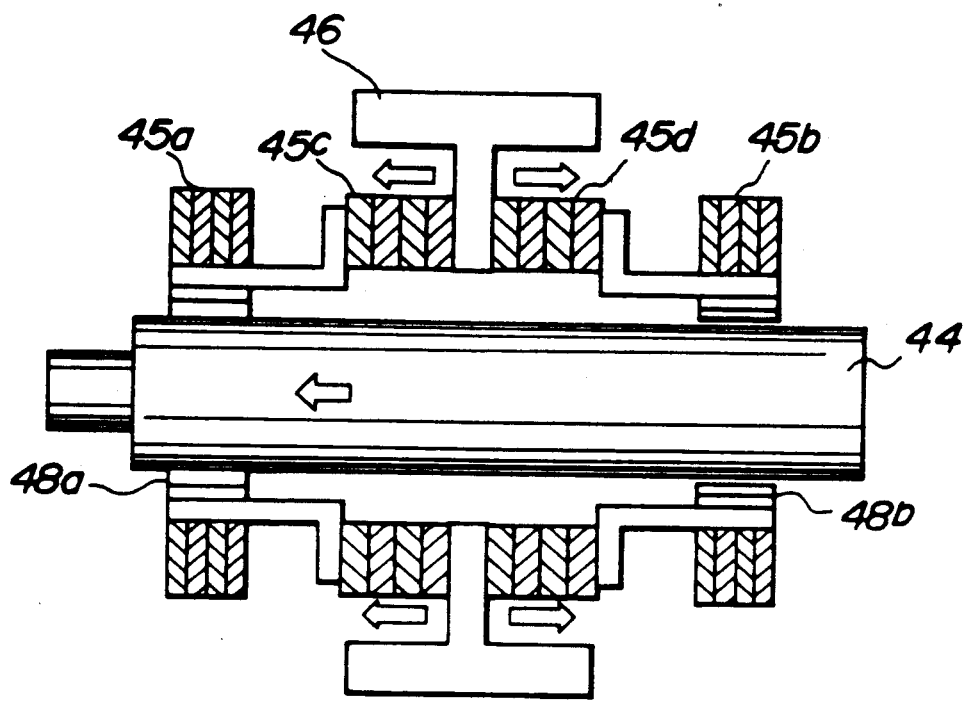
Figure 12:
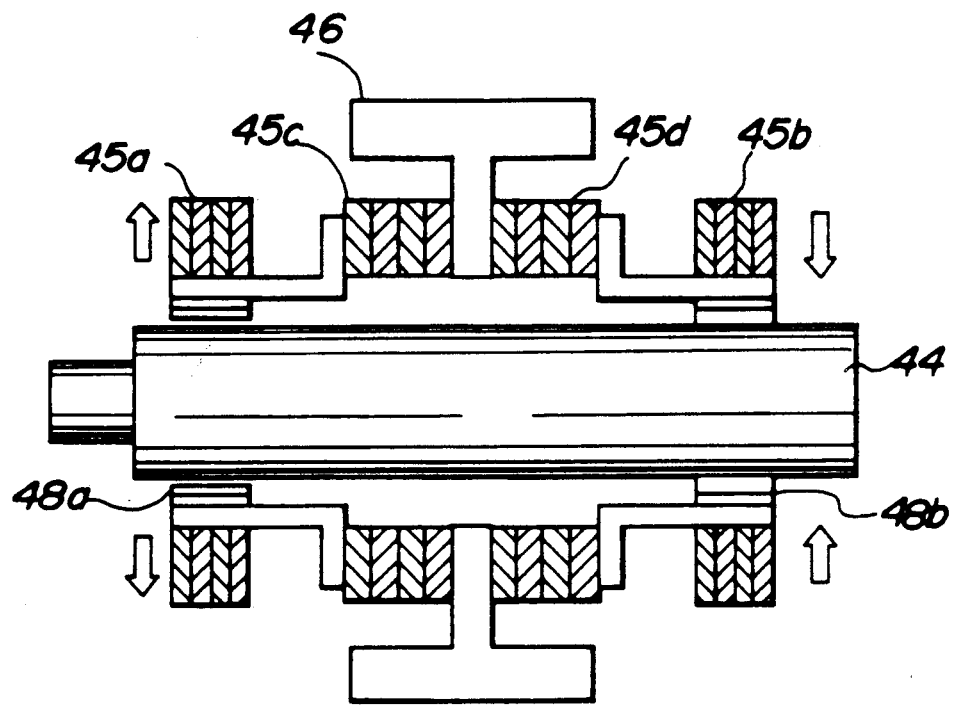
Figure 13:
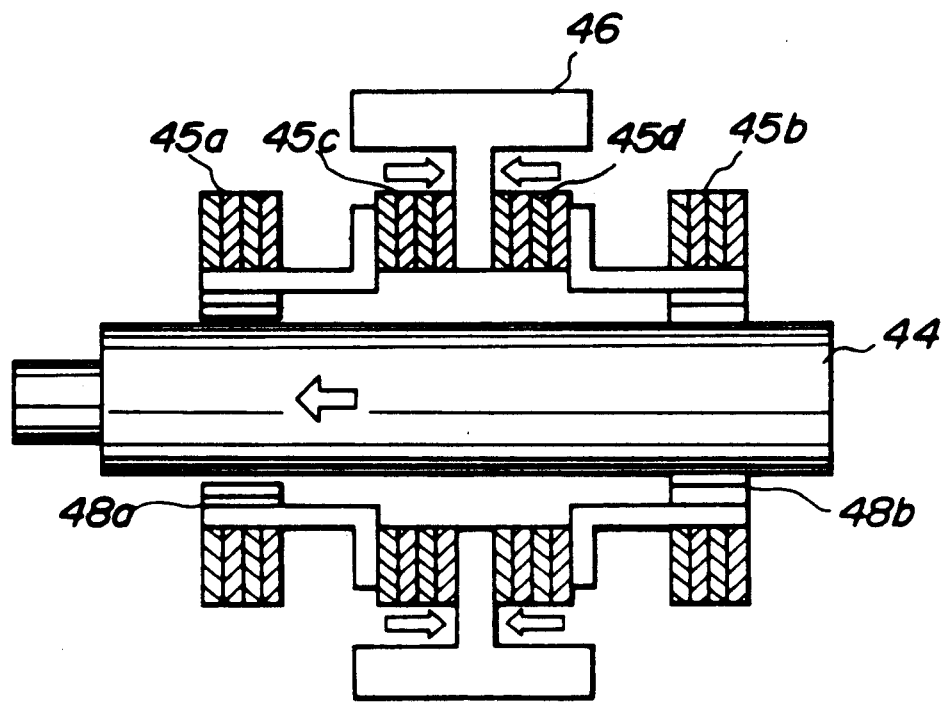

As shown in FIG. 10, a voltage is applied to the piezoelectric element 45a to flex the resilient bridge 47a toward the plunger 44 to cause the clamp ring 48a to clamp the plunger 44. Then, as shown in FIG. 11, a voltage is impressed on the piezoelectric elements 45c, 45d to axially elongate them to move the plunger 44 clamped by the clamp ring 48a in the axial direction of the arrow. Thereafter, as shown in FIG. 12, a voltage is applied to the piezoelectric element 45b to enable the clamp ring 48b to clamp the plunger 44, and the voltage applied to the piezoelectric element 45a is cut off to increase the inside diameter thereof, so that the plunger 44 is unclamped from the clamp ring 48a. Then, as shown in FIG. 13, the voltage applied to the piezoelectric elements 45c, 45d is eliminated to contract them in the directions of the arrows, thus further moving the plunger 44 clamped by the clamp ring 48b in the direction of the arrow.

The above inching process is repeated to move the plunger 44 axially in increments of micrometers or sub-micrometers. Therefore, the laminated piezoelectric actuator 40 can accurately operate the flow rate control valve 15 for effective regulation of the flow rate of flushing water.

In FIGS. 10 through 13, the plunger 44 is axially moved to the left. However, the plunger 44 may axially be moved to the right by reversing the order of energization of the piezoelectric elements 45a, 45b in FIGS. 10 and 12.

In the above embodiment, the flow rate control valve 15 comprises the diaphragm valve 33, and the actuator comprises the laminated piezoelectric actuator 40. The present invention is however not limited to these specific constructions. The actuator may for example be a piezoelectric bimorph actuator, a combination of a stepping linear motor and a rotatable screw, a combination of a stepping motor and a rotatable screw, and any of other motors and actuators. The flow rate control valve may be a pilot-operated valve, a directly operated spherical, cylindrical, or a portal valve.

Figure 14:
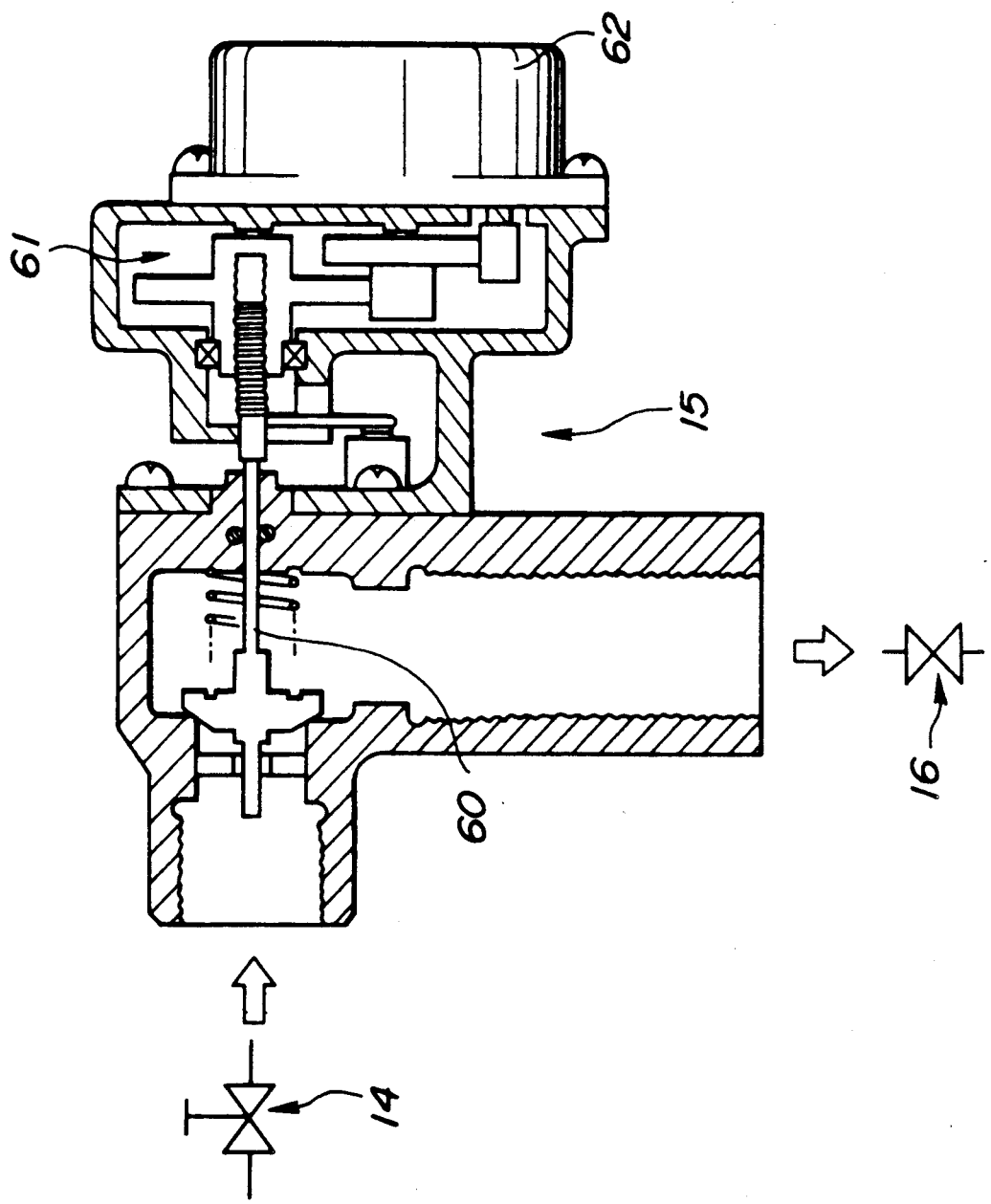
FIG. 14 is a cross-sectional view of a flow control valve according to another construction.

FIG. 14 shows one such alternative which comprises a spherical-valve spindle 60 which is drivable by a stepping motor 62 through a gear train 61.

Figure 15:
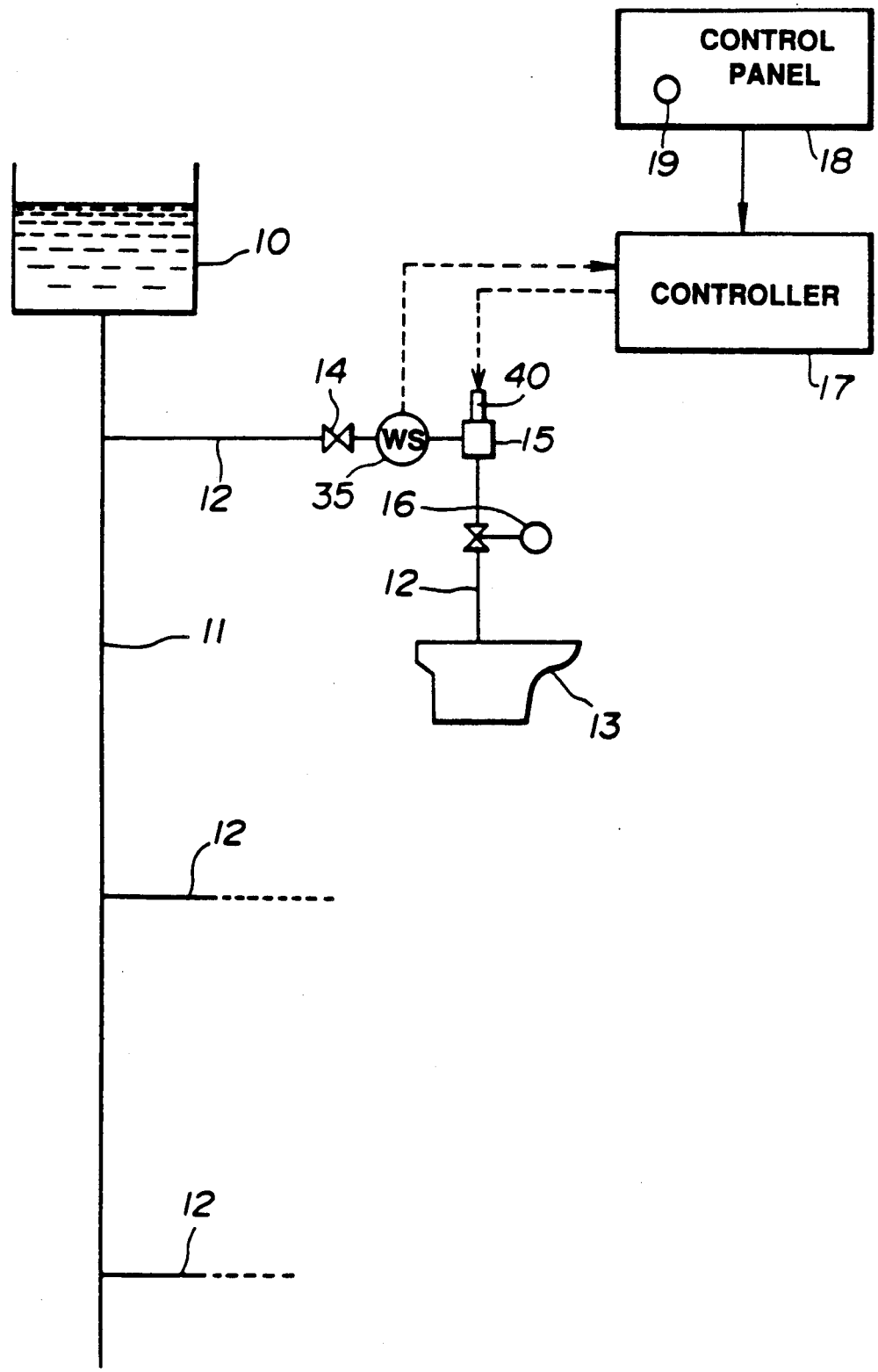
FIG. 15 is a schematic diagram, partly in block form, of a toilet bowl flushing device according to a second embodiment of the present invention.
Figure 16:
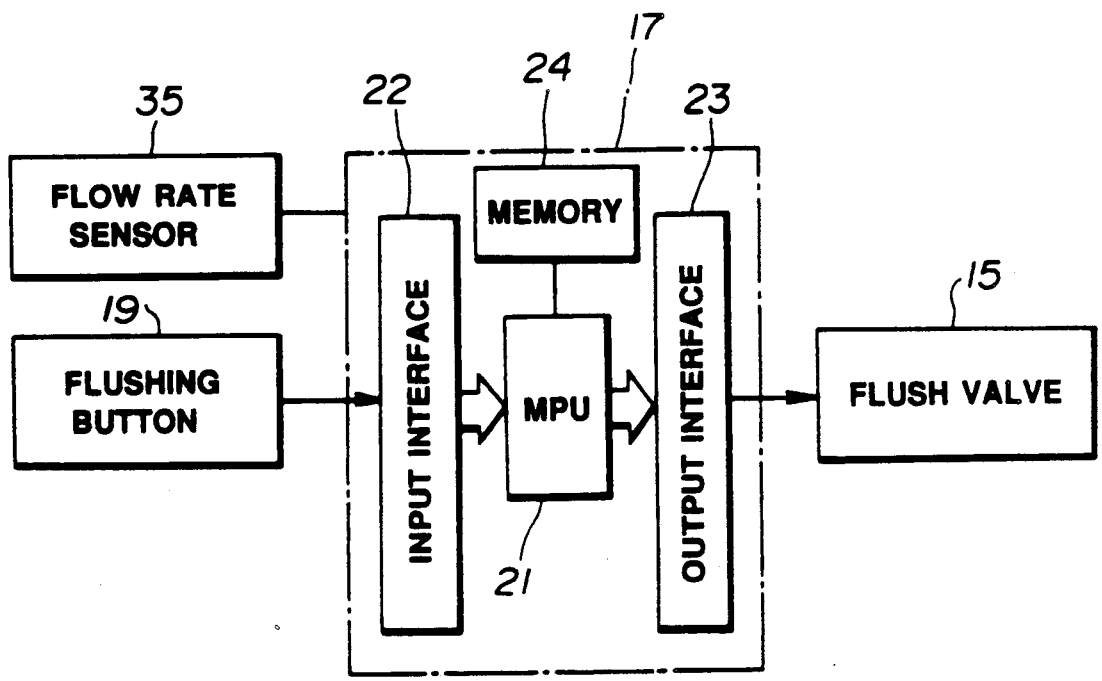
FIG. 16 is a block diagram of a controller of the toilet bowl flushing device of FIG. 15.

FIGS. 15 and 16 illustrate a toilet bowl flushing device according to a second embodiment of the present invention. The second embodiment differs from the first embodiment in that a flow rate sensor 35 is disposed between the flow rate control valve 15 and the shutoff cock 14.

When flushing water is supplied to and discharged from the toilet bowl 13, the actual flow rate of flushing water is detected by the flow rate sensor 35, and the detected flow rate is compared with a programmed value read from the memory 24. The flow rate control valve 15 is operated based on the result of the comparison to supply flushing water accurately according to the programmed flow rate pattern. The flow rate sensor 35 might be positioned downstream of the flow rate control valve 15. However, it would not be preferable to position the flow rate sensor 35 downstream of the flow rate control valve 15 since when the flow rate control valve 15 is closed, no water is present downstream of the flow rate control valve 15, and when water starts being supplied downstream of the flow rate control valve 15, air would flow into the flow rate sensor 35.

A toilet bowl flushing device in accordance with a third embodiment of the present invention will be described with reference to FIGS. 17 through 20.

Figure 17:
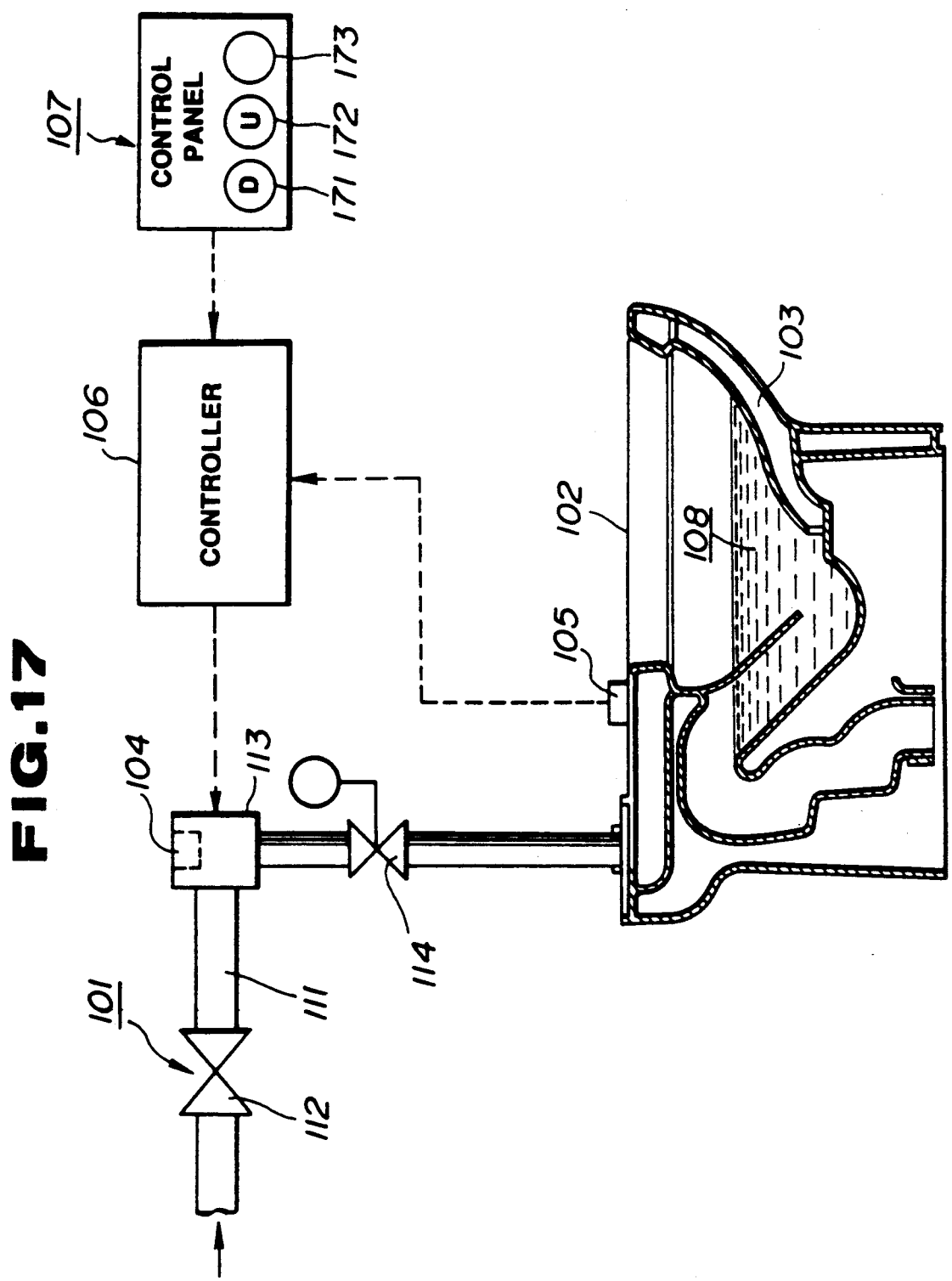
FIG. 17 is a schematic diagram, partly in block form, of a toilet bowl flushing device according to a third embodiment of the present invention.

As shown in FIG. 17, a water supply means 101 comprising a shutoff cock 112, a flow rate control valve 113, and a vacuum breaker 114 which are arranged in series in a water supply pipe 111 is connected to a toilet bowl 103 which stores sealed water 108.

The flow rate control valve 113 is actuated by an actuator 104 which is structurally identical to the laminated piezoelectric actuator 40 of the first embodiment described above.

The toilet bowl 103 has a seating sensor 105 for detecting whether the user has been seated on a seat 102 over the toilet bowl 103. The seating sensor 105 may be an optical or an acoustic sensor for detecting when the user is seated by detecting the presence of the user on the seat 102, or a pressure-sensitive sensor for detecting when the user is seated by detecting a pressure developed by the user seated on the seat 102. The seating sensor 105 is positioned in a suitable location around the toilet bowl 103 dependent on the type of the seating sensor 105.

The actuator 104 and the seating sensor 105 are connected to a controller 106. A detection signal from the seating sensor 105 is applied to the controller 106 which then controls operation of the actuator 104. To the controller 106, there is connected a control panel 107 having a defecation-mode button 171, a urination-mode button 172, and a set button 173.

Figure 18:
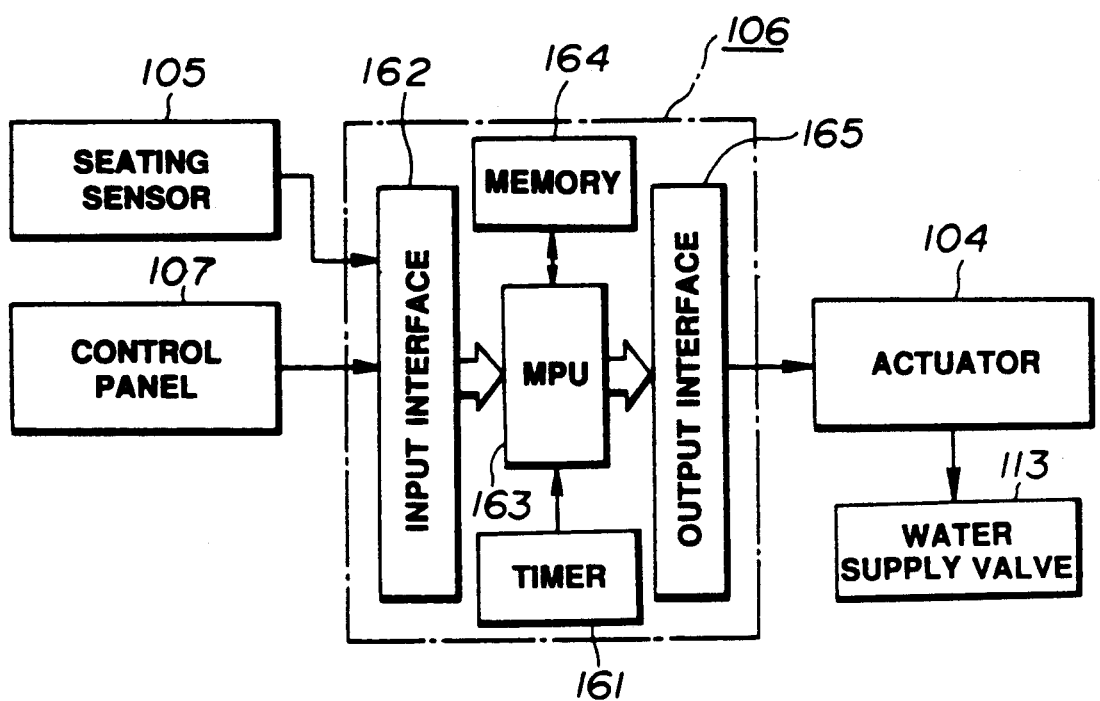
FIG. 18 is a block diagram of a controller of the toilet bowl flushing device illustrated in FIG. 17.
Figure 19:
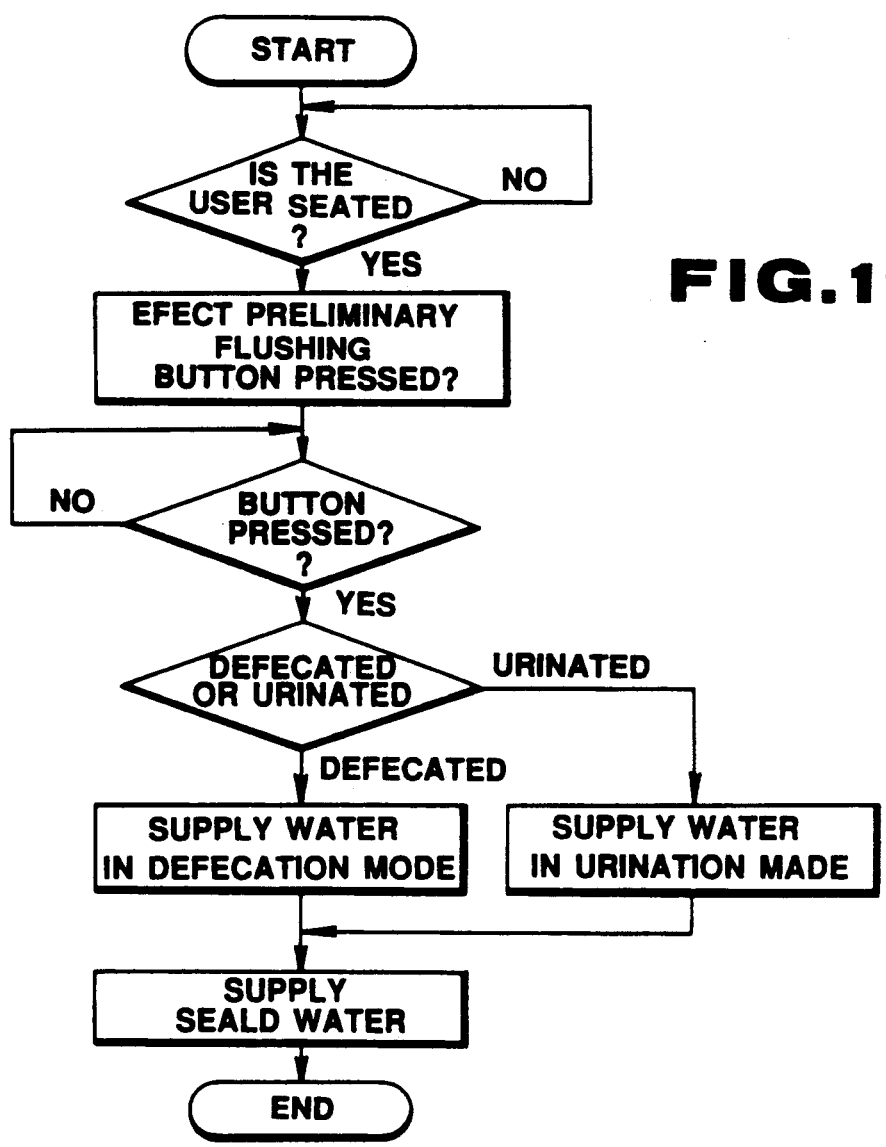
FIG. 19 is a flowchart of a control sequence.

A control sequence for controlling the flow rate control valve 113 is shown in detail in FIGS. 18 and 19.

With the set button 173 on the control panel 107 being turned on, the seating sensor 105 detects when the user is seated on the seat 102 over the toilet bowl 103. As shown in FIG. 18, a detection signal from the seating sensor 105 is applied to an input interface 162 of the controller 106, and an opening signal is output from a microprocessor 163 via an output interface 165 to the piezoelectric actuator 104. The piezoelectric actuator 104 then opens the flow rate control valve 113 to supply a smaller amount of flushing water to the toilet bowl 103 in a preliminary flushing mode. The preliminary flushing mode may be continued until the user leaves the seat 102 after defecation or urination, or may be stopped a predetermined period of time after the preliminary flushing mode has started. The preliminary flushing mode is finished by presetting the contents of a program stored in a memory 164. While no detection signal is being applied from the seating sensor 105, the piezoelectric actuator 104 is not operated, and the flow rate control valve 113 remains closed.

The flow rate control valve 113 may include a return spring for closing itself when it is not operated by the piezoelectric actuator 104. With this arrangement, the flow rate control valve 113 can be closed simply by interrupting the application of the opening signal to the piezoelectric actuator 104.

Figure 20:
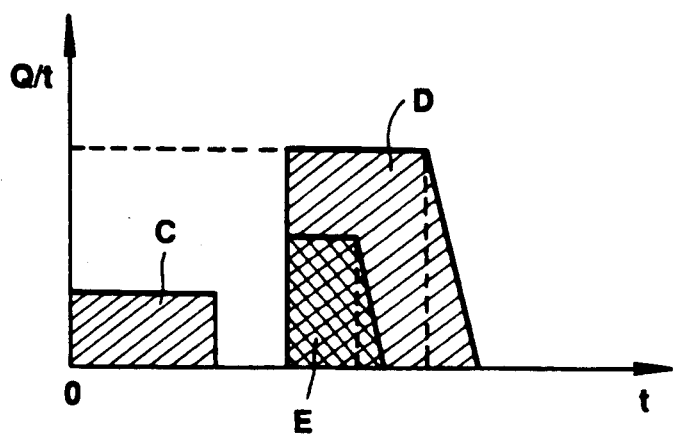
FIG. 20 is a graph showing how the amount of cleaning water varies.

After or during the preliminary flushing mode, the user selects and presses the defecation-mode button 171 after defecation or the urination-mode button 172 after urination. Then, the piezoelectric actuator 104 is controlled by the controller 106 to operate the flow rate control valve 113 to supply flushing water to the toilet bowl 103 in a main flushing mode. The flow rate of flushing water supplied in the preliminary and main flushing modes is controlled according to a flow rate pattern program stored in the memory 164. The flow rate pattern program may be preset as shown in FIG. 20. A shaded area C indicates a flow rate of flushing water in the preliminary flushing mode, D a flow rate of flushing water in the main flushing mode when the defecation-mode button is selected, and E a flow rate of flushing water in the main flushing mode when the urination-mode button is selected.

In the third embodiment, the laminated piezoelectric actuator is controlled by the controller to effect the preliminary flushing mode in response to a signal from the seating sensor. In the main flushing mode, the flow rate of flushing water to be supplied is controlled differently in the defecation or urination mode dependent on the selector mode button pressed by the user. The flow rate control thus carried out can prevent the toilet bowl from running short of sealed water and also prevent a water hammer from occurring in the piping system coupled to the toilet bowl.

FIGS. 21 through 25 illustrate a toilet bowl flushing device according to a fourth embodiment of the present invention.

Figure 21:
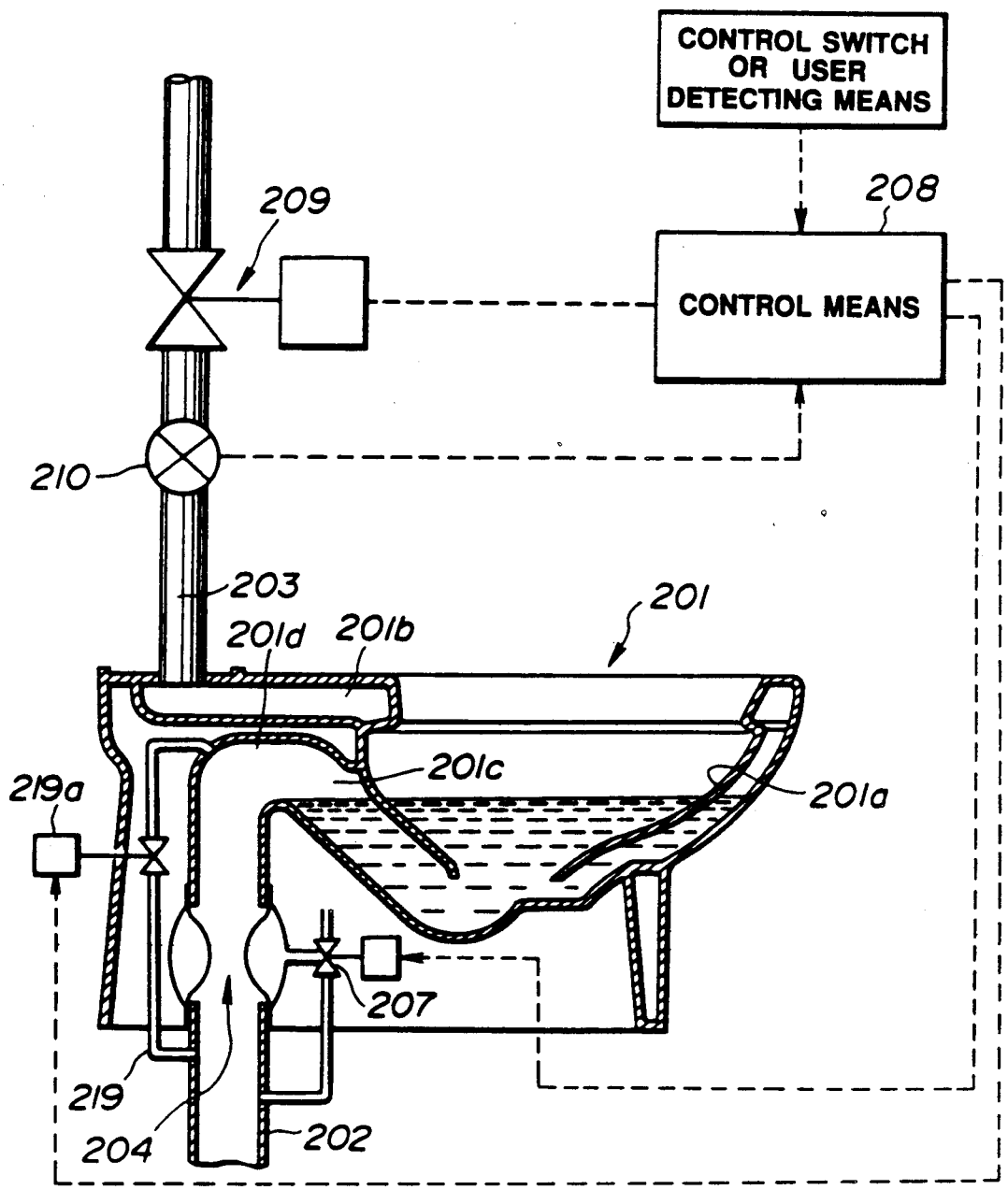
FIG. 21 is a schematic diagram, partly in block form, of a toilet bowl flushing device according to a fourth embodiment of the present invention.

As shown in FIG. 21, the toilet bowl 201 has a bowl unit 201a including a double-walled upper structure defining a flow passage 201b for guiding flushing water supplied from a water supply pipe 203 into the bowl unit 201a. The bowl unit 201a has a trap pipe 201c in a side thereof for guiding flushing water upwardly from the bottom of the bowl unit 201a, with a water discharge valve 204 disposed between the trap pipe 201c and a water discharge pipe 202. A bypass pipe 219 extends from the trap pipe 201c to the water discharge pipe 202 in bypassing relation to the water discharge valve 204. The bypass pipe 219 has therein a bypass on/off valve 219a for selectively opening and closing the bypass pipe 219.

As illustrated in FIGS. 22 and 23, a rubber valve member 206 is attached to the inner periphery of a substantially barrel-shaped cylindrical body 205 interposed between the trap pipe 201c and the water discharge pipe 202. The valve member 206 has upper and lower ends 206a, 206b anchored respectively in upper and lower retainers 205a, 205b of the cylindrical body 205. Water can be supplied into or discharged from the space between the valve member 206 and the cylindrical body 205 by means of a three-way valve 207 which is operated by a control means 208.

When water is supplied to the water discharge valve, or regulating valve, 204 from the three-way valve 207, the rubber valve member 206 is expanded radially inwardly in the cylindrical body 205 to reduce the diameter of the flow passage through the valve 204, as shown in FIG. 23, thus substantially closing the regulating valve 204. When water is discharged from the regulating valve 204 by the three-way valve 207, the regulating valve 204 is opened.

The valve member 206 may be increased in its mechanical strength by placing a mesh of Teflon on the outer surface thereof. As shown in FIG. 24, the valve member 206 may have a fin 206c on its lower portion which will project radially inwardly when the valve member 206 is expanded radially inwardly to efficiently reduce the diameter of the regulating valve.

The bypass pipe 219 serves to remove air from an upper portion of the trap pipe 201c for achieving an efficient siphoning effect when water is filled in the trap pipe 201c. The bypass on/off valve 219a is actuated by the control means 208 as described later on.

The water supply pipe 203 guides flushing water into the toilet bowl 201, and has an on/off valve 209 for selectively opening and closing the water supply pipe 203. An amount-of-water detecting means 210 is disposed in the water supply pipe 203 between the on/off valve 209 and the toilet bowl 201.

The on/off valve 209 may comprise a solenoid-operated valve or an electrically operated valve, and is actuated by the control means 208 based on a signal from a switch operated by the user or a detection signal from a seating sensor which detects when the user is seated on the toilet bowl 201.

The amount-of-water detecting means 210 comprises an amount-of-water sensor employing a vane wheel, for example, and applies a detection signal to the control means 208. The amount-of-water detecting means 210 detects the amount of water supplied to the toilet bowl by detecting the amount of flushing water supplied via the on/off valve 209.

Figure 25:
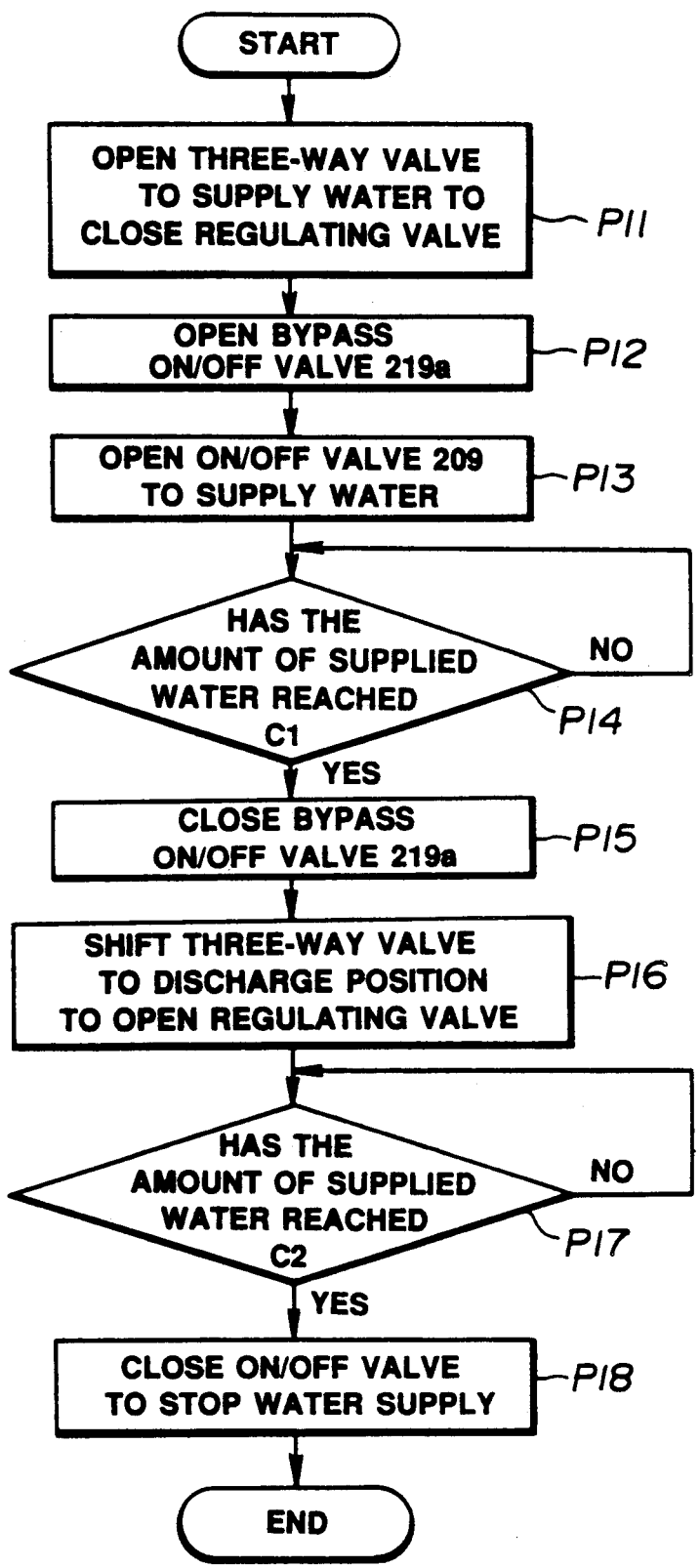
FIG. 25 is a flowchart of a control sequence.

Operation of the toilet bowl flushing device shown in FIGS. 21 through 24 will be described with reference to FIG. 25.

When a flushing process is started by the user, or a flushing process is initiated by a detection signal from the seating sensor which detects when the user is seated on the toilet seat, the control means 208 opens the three-way valve 207 to supply water to the regulating valve 204 to close the valve 204 in a step P11. Then, the bypass on/off 219a is opened in a step P12, and the on/off valve 209 is opened to start supplying flushing water in a step P13. Thereafter, a step P14 determines whether the amount of supplied flushing water, i.e., the level of flushing water in the bowl unit 201a has reached a value C1 which is higher than the upper portion 201d of the trap pipe 201c by a prescribed value to fill the trap pipe 201c with flushing water, based on an output signal from the amount-of-water detecting means 210. If the amount of supplied flushing water has reached the value C1, then the bypass on/off valve 219a is closed in a step P15 and the three-way valve 207 is shifted to discharge water from the regulating valve 204 to open the valve 204 in a step P16. The water is automatically discharged from the regulating valve 204 under the resiliency of the rubber valve member 206 and the water pressure in the trap pipe 201c when the three-way valve 207 is shifted into the discharge position. Subsequently, if the amount of supplied flushing water has reached a given value C2 as detected by an output signal from the amount-of-water detecting means 210 in a step P17, then the on/off valve 209 is closed to stop the supply of flushing water, whereupon one sequence of washing out the toilet bowl 201 is completed. The on/off valve 209 may be controlled by the control means 208 to supply flushing water to the toilet bowl according to a predetermined flow rate pattern program, as with the first embodiment.

In the illustrated embodiment above, water is fed into the space between the rubber valve member 206 and the cylindrical body 205 to close the water discharge or regulating valve 204. However, any of other suitable liquids or a gas such as air under pressure may be supplied between the rubber valve member 206 and the cylindrical body 205.

According to the fourth embodiment shown in FIGS. 21 through 25, flushing water is supplied while the water discharge valve 204 is being closed and air is being removed from the trap pipe 201c through the bypass pipe 219. Therefore, the trap pipe 201c is sufficiently filled with flushing water. Since the water discharge valve 204 is subsequently opened, the trap pipe 219 can effectively siphon flushing water to efficiently wash out the toilet bowl 201 without supply a large amount of flushing water to fill the trap pipe 201c.

The water discharge pipe 204 may be of any of various designs shown in FIGS. 26 through 36.

FIGS. 26 and 27 show a ball valve 221 which is rotated by a motor 220 energized by the control means to open and close the water discharge pipe 202. The ball valve 221 is sealed by seal members 222, 223.

FIG. 28 shows a water discharge valve employing members made of a shape memory alloy. More specifically, coils 225, 226 of a shape memory alloy are coaxially disposed between a rubber valve member 224, which is identical to the rubber valve member 206 shown in FIG. 23, and the inner wall surface 202a of the cylindrical body or water discharge pipe 202. The coil 225 shown in FIG. 29 takes on a cylindrical shape when it is heated, and the coil 226 shown in FIG. 30 takes on a substantially hyperboloidal shape or a drum shape with its diameter progressively reduced toward the center. For opening the water discharge valve, the coil 225 is heated by passing an electric current therethrough, and for closing the water discharge valve, the coil 226 is heated by passing an electric current therethrough.

Figure 31:
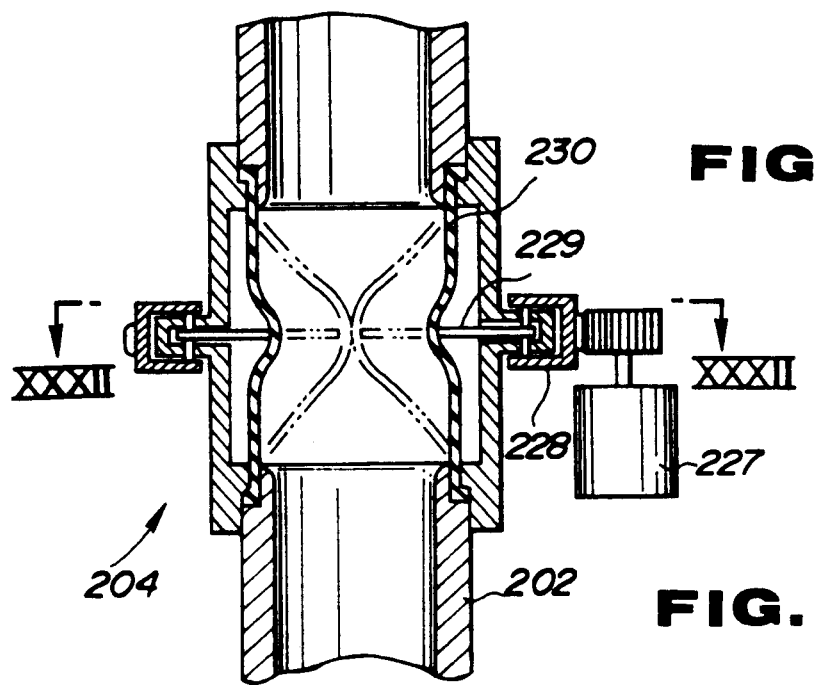
FIG. 31 is a cross-sectional view of a water discharge valve according to a further embodiment.
Figure 32:
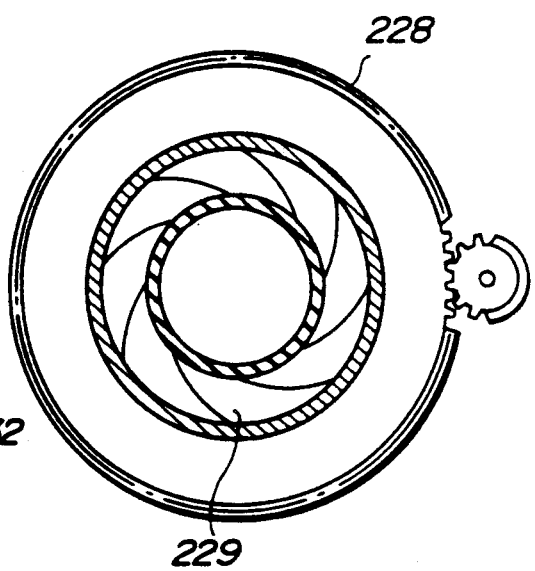
FIG. 32 is a cross-sectional view taken along line XXXII—XXXII of FIG. 31.

FIGS. 31 and 32 show a shutter valve having a ring member 228 which is rotated by a motor 227 to open and close a shutter 229 for thereby opening and closing the water discharge pipe 202 through a rubber seal 230.

Figure 33:
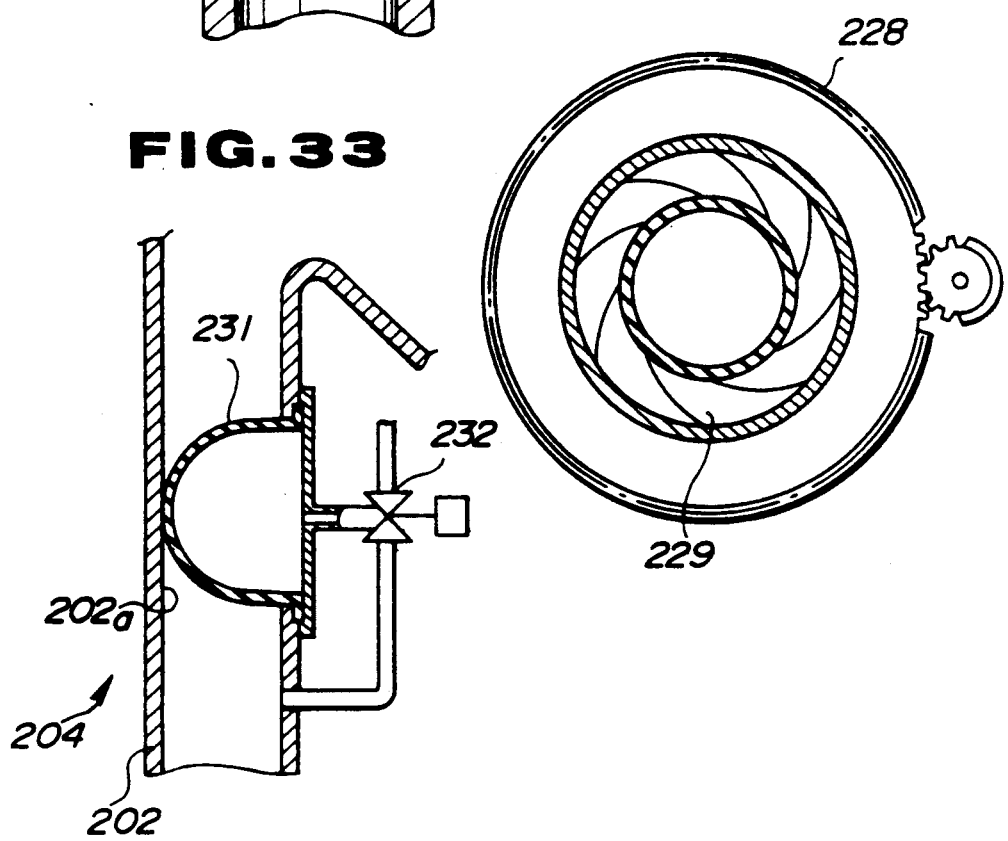
FIG. 33 is a cross-sectional view of a water discharge valve according to a still further embodiment.

FIG. 33 illustrates a a rubber valve member 231 attached to one side of an inner wall surface 202a of the water discharge pipe 202. The rubber valve member 231 is expanded to close the water supply pipe 231 by water supplied into the space between the valve member 231 and the wall surface of the water supply pipe 202 by a three-way valve 232 identical to the three-way valve 207 show in FIG. 21.

Figure 34:
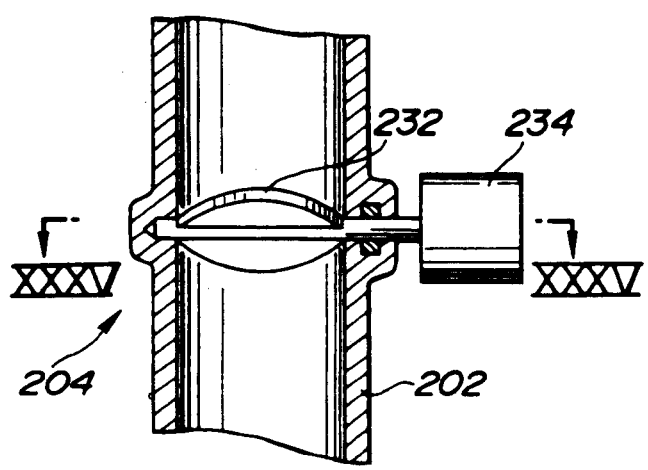
FIG. 34 is a cross-sectional view of a water discharge valve according to a still further embodiment.
Figure 35:
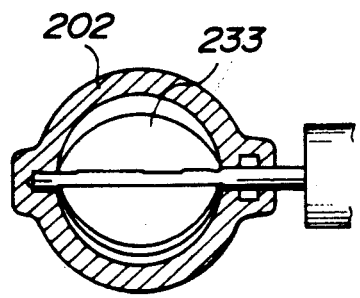
FIG. 35 is a cross-sectional view taken along line XXXV—XXXV of FIG. 34.

FIGS. 34 and 35 illustrate a butterfly valve having a valve member 232 which is rotatable about its shaft by a motor 234 to open and close the water supply pipe 202.

Figure 36:
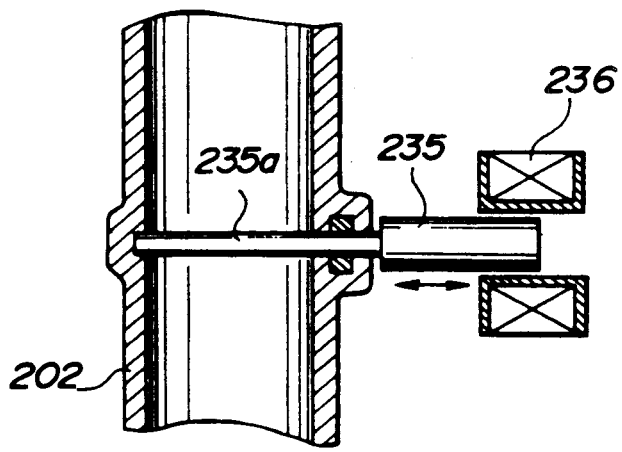
FIG. 36 is a cross-sectional view of a water discharge valve according to a yet further embodiment.

FIG. 36 shows a flat valve member 235a attached to an end of a moving iron member 235 movable by an electromagnetic coil 236. In response to energization and de-energization of the coil 236, the flat valve member 235a is movable into and out of the water supply pipe 202 to close and open the pipe 202.

Figure 37:
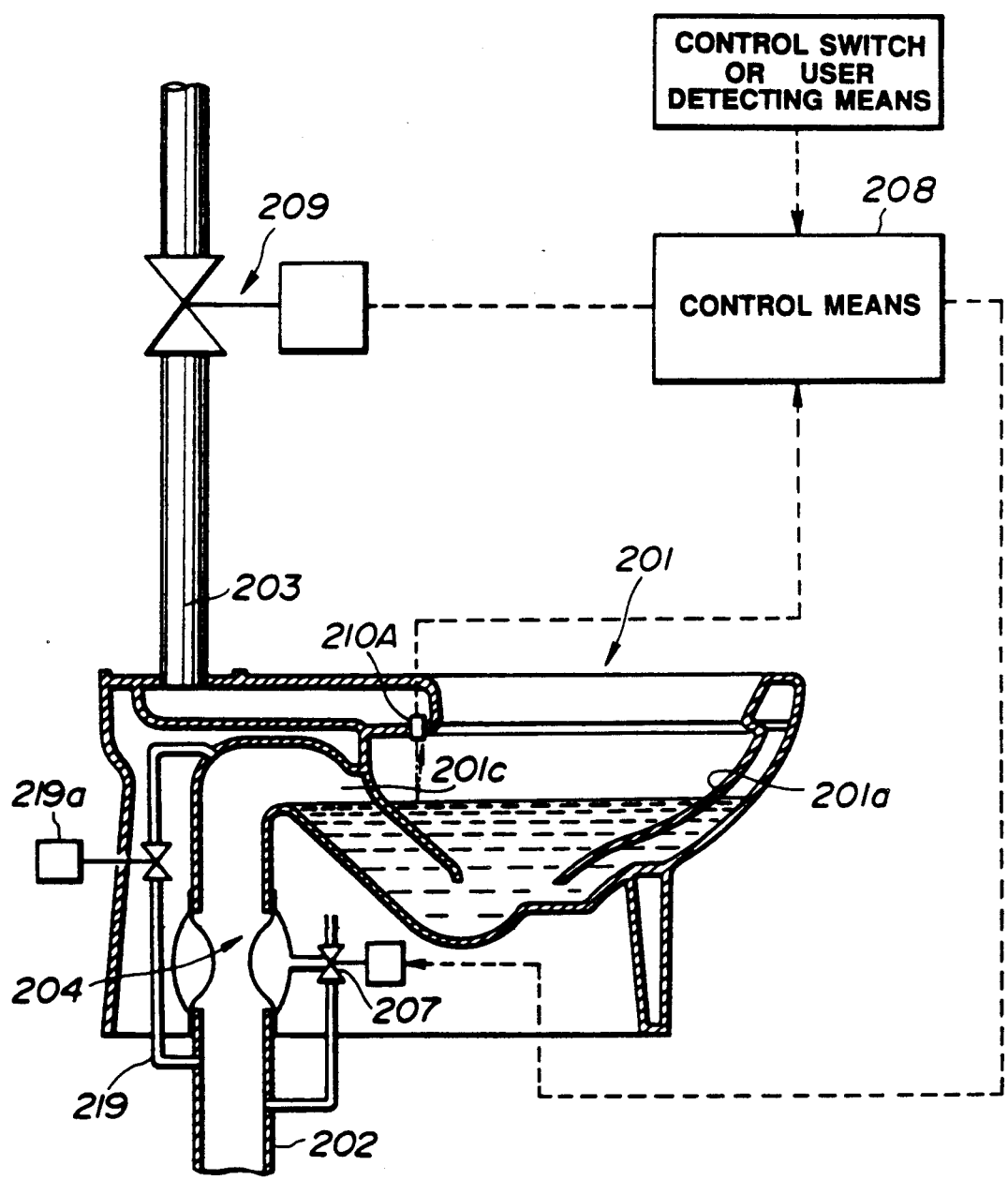
FIGS. 37 and 38 are cross-sectional views showing an amountof-water detecting means according to other embodiments of the invention.
Figure 38:
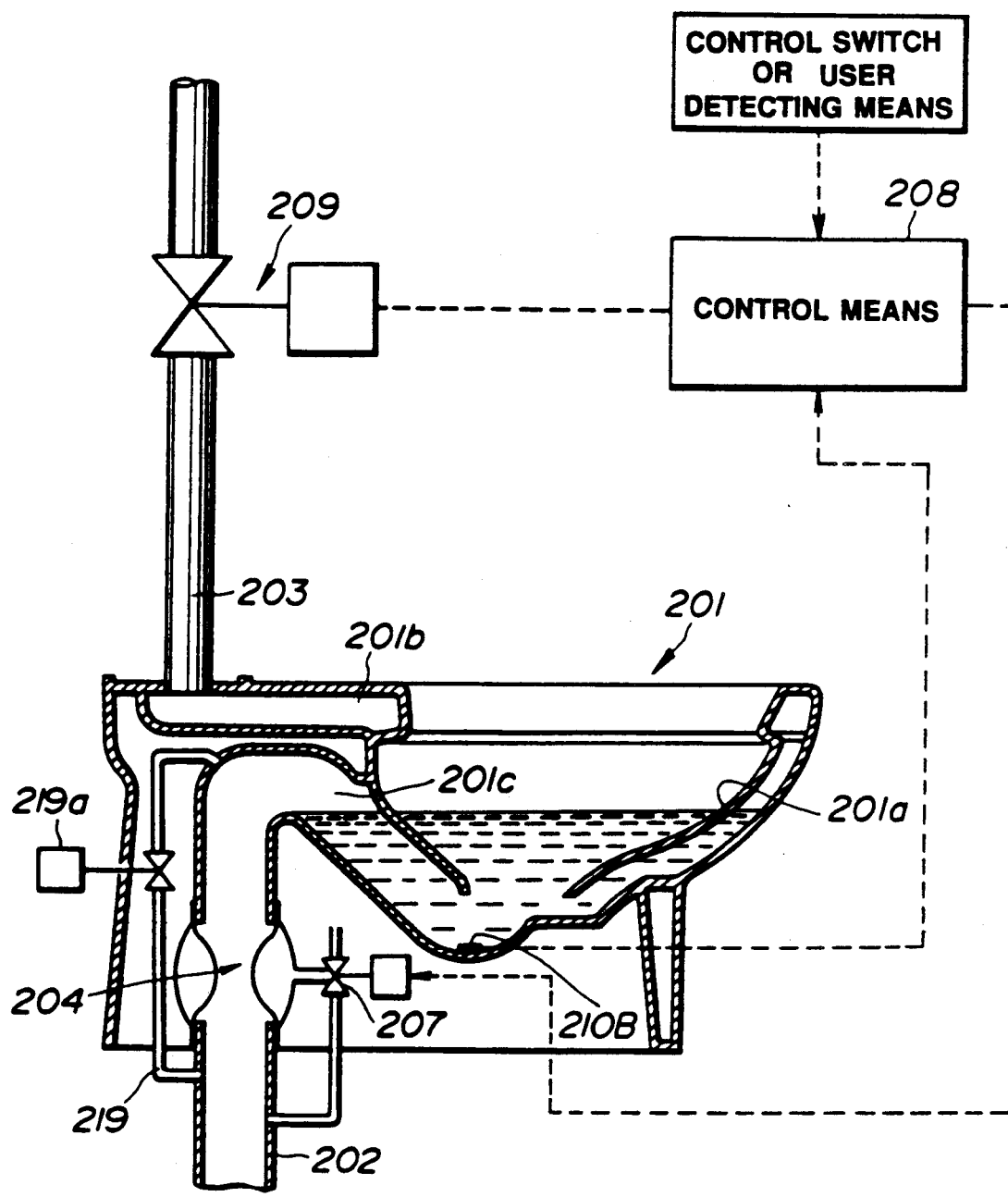

FIG. 37 shows an amount-of-water detecting means according to another embodiment of the present invention. This amount-of-water detecting means comprises a water level sensor 210A of the non-contact type in the form of an ultrasonic sensor, a photosensor, or the like which is attached to an upper portion of the bowl unit 201a, or a water level sensor of the contact type such as a float switch or the like (not shown) disposed in the bowl unit 201a. FIG. 38 shows another amount-of-water detecting means in the form of a pressure sensor 210B mounted on the bottom of the bowl unit 201a for detecting the water level as a pressure of water contained in the bowl unit 201a.

Figure 39:
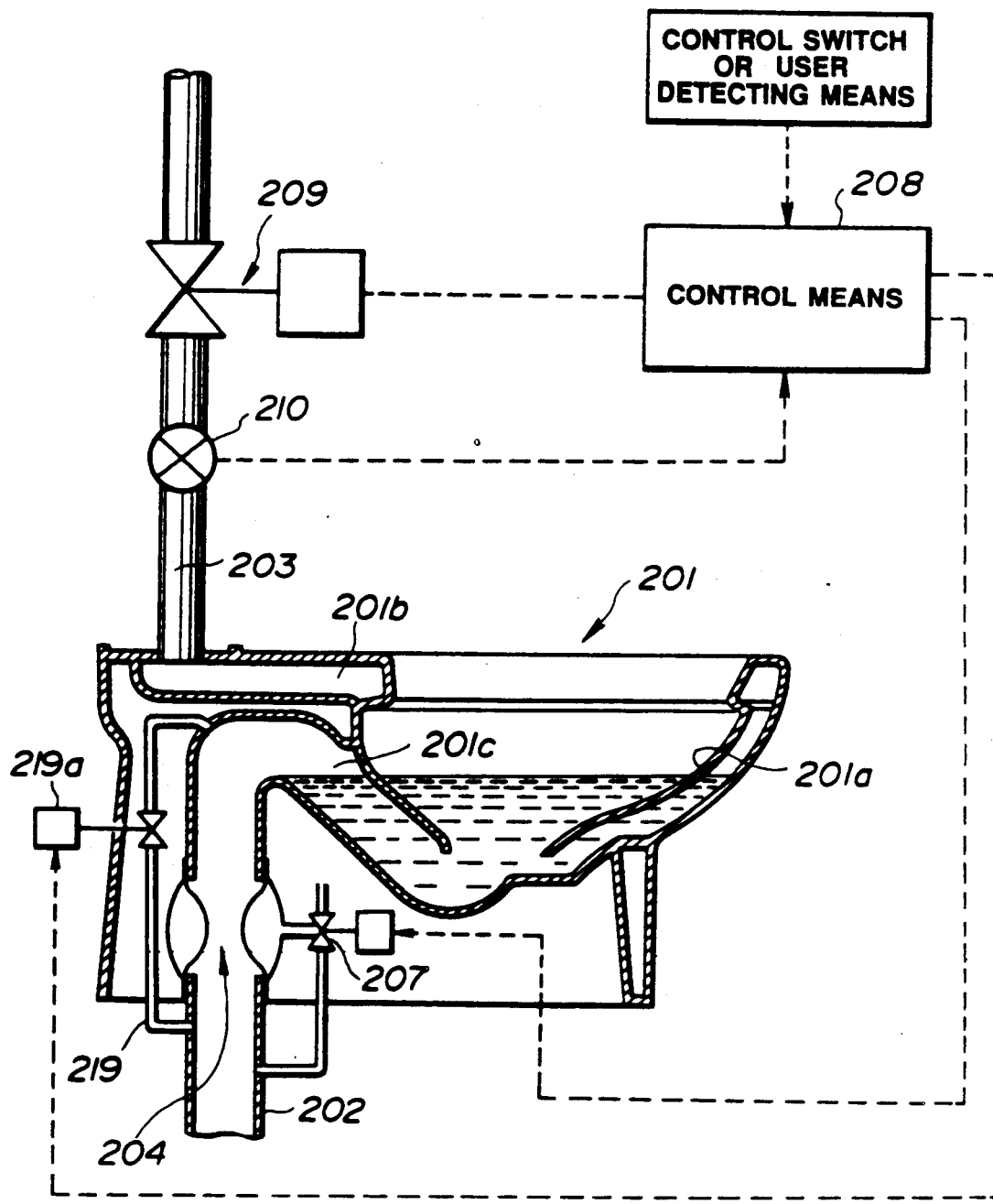
FIGS. 39 and 40 are cross-sectional views showing a bypass pipe according to another embodiment.
Figure 40:
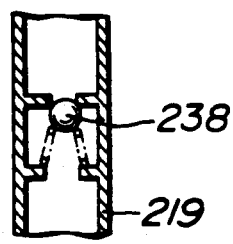
Figure 41:
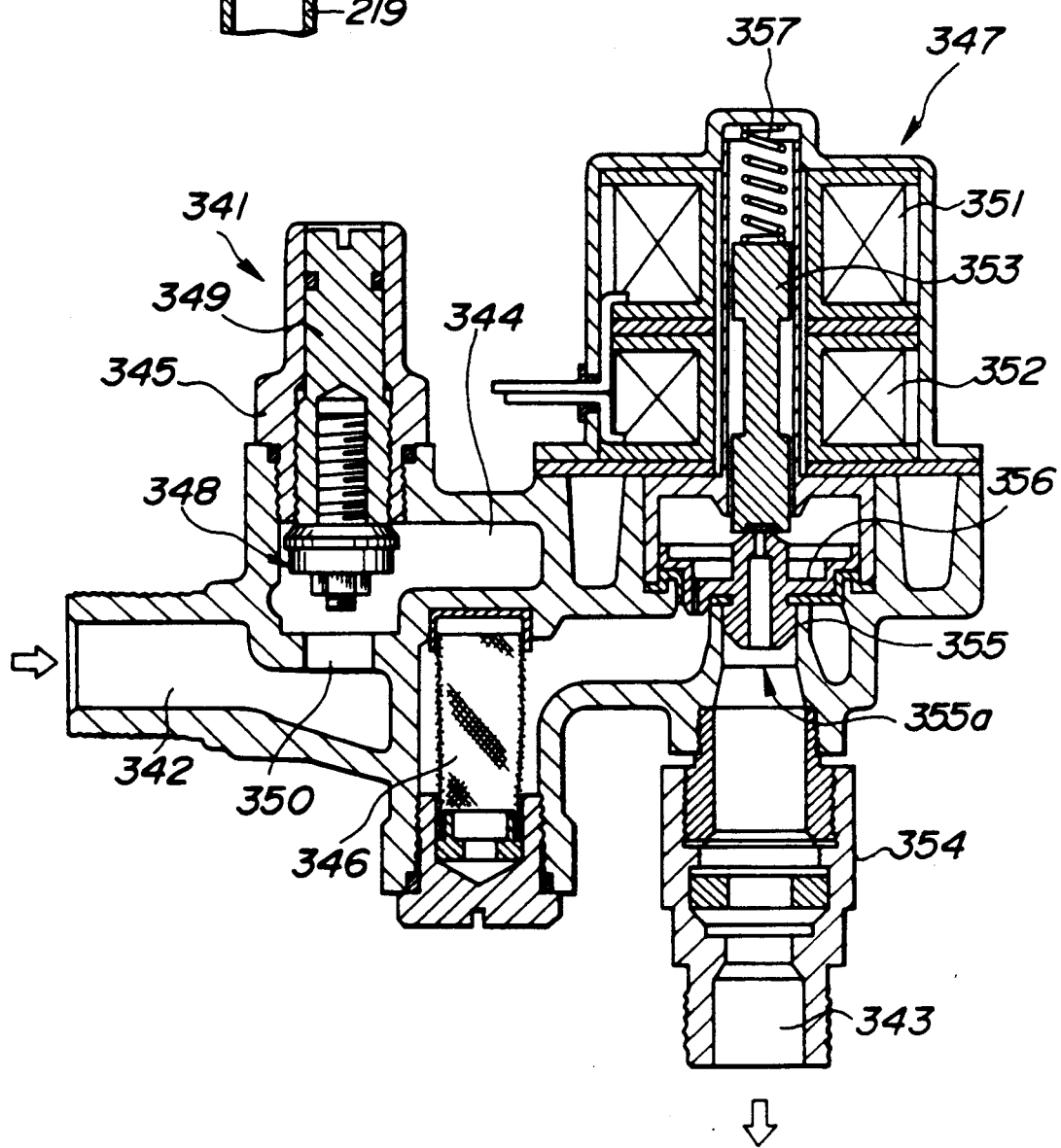
FIG. 41 is a cross-sectional view of a solenoid-operated valve assembly in a conventional toilet bowl flushing device.

As illustrated in FIGS. 39 and 40, a bypass pipe 219 may have a check valve 238 disposed therein for preventing flushing water from flowing from the water discharge pipe 202 back to the trap pipe 210c via the bypass pipe 219.

According to the fourth embodiment, since the trap pipe is filled with flushing water while the water discharge valve is being closed and air is being removed from the trap pipe, flushing water is effectively retained in the trap pipe for enabling the trap pipe to siphon flushing water from the toilet bowl. After flushing water is filled in the trap pipe, the water discharge valve is opened to discharge flushing water. Therefore, a small amount of flushing water supplied is enough to fill the trap pipe to siphon flushing water subsequently from the toilet bowl.

With the present invention, as described above, the rate of flow of supplied flushing water is caused to vary with time in one flushing cycle according to a flow rate pattern program. Flushing water can thus be supplied to the toilet bowl in a preset optimum flow rate pattern dependent on the configuration of the toilet bowl, the characteristics of the piping, the pressure of the flushing water, and other factors. The toilet bowl flushing capability is thus greatly increased, and the amount of flushing water used is minimized.

The actuator for operating the flow rate control valve comprises a laminated piezoelectric actuator which is operable in small strokes or increments and hence in substantially continuous motion. Therefore, the flow rate of supplied flushing water can accurately be controlled according to the predetermined flow rate pattern program.

Inasmuch as the operation of the actuator is precisely controllable, the flow rate can be controlled in patterns suitable for the preliminary and main flushing modes. In the main flushing mode, flushing water can be supplied at flow rates most effective in the defecation and urination modes to prevent the toilet bowl from running short of sealed water and also preventing a water hammer from occurring in the piping system connected to the toilet bowl.

The trap pipe can effectively siphon flushing water from the toilet bowl with a smaller amount of flushing water used to prime the trap pipe. Accordingly, the total amount of flushing water used is reduced.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A toilet bowl flushing device comprising:
   water supply means for supplying flushing water to a toilet bowl, said water supply means including flow rate control valve means for controlling a rate of flow of flushing water to be supplied to the toilet bowl;
   actuator means for actuating said flow rate control valve means through a reciprocally movable plunger, said actuator means being operable in an inching manner so that the plunger is axially moved in increments or decrements of minute distance; and
   control means operable according to a predetermined flow rate pattern program for controlling operation of said actuator means to vary the rate of flow of flushing water by moving the plunger in a stepwise manner in one flushing cycle with respect to time from a time to start flushing the toilet bowl to a time to finish flushing the toilet bowl.

2. A toilet bowl flushing device according to claim 1, wherein said control means includes means for controlling operation of said actuator means to progressively reduce the flow rate of flushing water.

3. A toilet bowl flushing device according to claim 2, wherein said means includes means for controlling operation of said actuator means to supply flushing water in three different stepwise flow rates.

4. A toilet bowl flushing device according to claim 1, wherein said flow rate control valve means includes a valve member, said actuator means comprising a piezoelectric actuator with said plunger having one end connected to said valve member, and piezoelectric element assembly means for axially moving said plunger.

5. A toilet bowl flushing device according to claim 4, wherein said piezoelectric element assembly means comprises a first laminated piezoelectric element expandable radially of said plunger to clamp the plunger in response to energization, a second laminated piezoelectric element expandable axially of said plunger to move said plunger and said first laminated piezoelectric element in response to energization, and a support member supporting said first and second laminated piezoelectric elements.

6. A toilet bowl flushing device according to claim 4, further comprising seating sensor means for detecting when a user is seated on a toilet seat over the toilet bowl, and selector means operable by the user for selecting one of a defecation flushing mode and a urination flushing mode, said control means including means for operating said actuator means in response to a signal from said seating sensor means and a signal from said selector means.

7. A toilet bowl flushing device according to claim 6, wherein said control means includes means responsive to the signal from said seating sensor means for supplying a relatively small amount of flushing water in a preliminary flushing mode, and also responsive to the signal from said selector means for supplying a relatively large amount of flushing water in the defecation flushing mode or a relatively small amount of flushing water in the urination flushing mode.

8. A toilet bowl flushing device according to claim 1, further comprising:
  a trap pipe for siphoning flushing water which has been supplied to the toilet bowl by said water supply means;
  a water discharge pipe connected to said trap pipe;
  a water discharge valve disposed in said water discharge pipe;
  a bypass pipe interconnecting said trap pipe and said water discharge pipe in bypassing relation to said water discharge valve;
  a bypass on/off valve for selectively opening and closing said bypass pipe; and
  amount-of-water detecting means for detecting an amount of water supplied to the toilet bowl by said water supply means;
  said control means including means for closing said water discharge valve and supplying flushing water to the toilet bowl when the toilet bowl starts being washed out, and for simultaneously opening said bypass on/off valve, and for subsequently opening said water discharge valve to discharge flushing water from the toilet bowl and simultaneously closing said bypass on/off valve when the amount of flushing water supplied to the toilet bowl is detected as having reached a predetermined amount by said amount-of-water detecting means.

9. A toilet bowl flushing device according to claim 8, wherein said amount-of-water detecting means comprises an amount-of-water sensor for detecting the amount of flushing water flowing through said water supply means.

10. A toilet bowl flushing device according to claim 8, wherein said amount-of-water detecting means comprises water level sensor means for detecting a level of flushing water in the toilet bowl.

11. A toilet bowl flushing device according to claim 8, wherein said amount-of-water detecting means comprises pressure sensor means for detecting a pressure of flushing water at a bottom of the toilet bowl.

* * * * *

UNITED STATES PATENT AND TRADEMARK OFFICE
CERTIFICATE OF CORRECTION

PATENT NO. : 4,989,277

DATED : February 5, 1991

INVENTOR(S) : Tsutsui et al.

It is certified that error appears in the above-identified patent and that said Letters Patent is hereby corrected as shown below:

Column 4, line 6, "amountof-water" should be --amount-of-water--.

Column 5, line 67, "moved" should be --move--.

Column 6, line 34, "of" should be --or--.

Column 10, line 45, "supply" should be --supplying--.

Column 11, line 5, after "illustrates" delete the second occurence of "a".

Column 11, line 12, "show" should be --shown--.

Signed and Sealed this

Twenty-third Day of November, 1993

Attest:

BRUCE LEHMAN

Attesting Officer

Commissioner of Patents and Trademarks